(12) United States Patent
Baer et al.

(10) Patent No.: US 11,279,270 B2
(45) Date of Patent: Mar. 22, 2022

(54) OCCUPANT PROTECTION SYSTEM AND METHOD INCLUDING SEATBACK

(71) Applicant: Zoox, Inc., Foster City, CA (US)

(72) Inventors: Michael Anthony Baer, Foster City, CA (US); Mark Alan Bates, Kenilworth (GB); Markus Jost, San Mateo, CA (US); Brandon Loeb, Campbell, CA (US); Karthikeyan Marudhamuthu, Troy, MI (US); Andrew John Piper, Palo Alto, CA (US); Marcos Puerta Terron, Cheltenham (GB); Kern Rameshwar Sharma, San Mateo, CA (US)

(73) Assignee: Zoox, Inc., Foster City, CA (US)

( * ) Notice: Subject to any disclaimer, the term of this patent is extended or adjusted under 35 U.S.C. 154(b) by 38 days.

(21) Appl. No.: 16/664,069

(22) Filed: Oct. 25, 2019

(65) Prior Publication Data

US 2021/0122270 A1   Apr. 29, 2021

(51) Int. Cl.
*B60N 2/427* (2006.01)
*B60N 2/42* (2006.01)

(52) U.S. Cl.
CPC ....... *B60N 2/42709* (2013.01); *B60N 2/4221* (2013.01); *B60N 2/4228* (2013.01); *B60N 2/4279* (2013.01)

(58) Field of Classification Search
CPC .......................... B60N 2002/026; B60N 2/70; B60N 2/42709; B60N 2/643; B60N 2/646; B60N 2/665; B60N 2/4214; B60N 2/4221; B60N 2/4228
See application file for complete search history.

(56) References Cited

U.S. PATENT DOCUMENTS 3,000,020 A * 9/1961 Lombard ........... B60N 2/42709
                                                                              5/653
5,580,124 A * 12/1996 Dellanno ............... B60N 2/803
                                                                              297/216.12
(Continued)

FOREIGN PATENT DOCUMENTS

DE          19938698 A1 *  2/2001   ......... B60N 2/42763

OTHER PUBLICATIONS

The PCT Search Report and Written Opinion dated Feb. 4, 2021 for PCT application No. PCT/US2020/057179, 8 pages.

*Primary Examiner* — Timothy J Brindley
(74) *Attorney, Agent, or Firm* — Lee & Hayes, P.C.

(57) ABSTRACT

A seat for a vehicle may include a seatback including an intermediate portion including a first portion having a first stiffness and a second portion including a second material different than a first material of the first portion, such that the seatback quickly couples an associated occupant and dissipates as much energy as possible. The intermediate portion may be configured such that as at least a portion of the back of an occupant of the seat pushes against a front surface of the seatback and the seatback is at least partially compressed, a reaction force from the seatback against at least a portion of the back of the occupant increases from a minimal reaction force to a first reaction force corresponding to a first displacement, and thereafter the reaction force decreases to a second reaction force as displacement of the front surface of the seatback further displaces.

19 Claims, 8 Drawing Sheets

(56) References Cited

U.S. PATENT DOCUMENTS

| | | | |
|---|---|---|---|
| 5,769,489 A * | 6/1998 | Dellanno | B60N 2/888 |
| | | | 297/216.14 |
| 6,820,930 B2 * | 11/2004 | Dellanno | B60N 2/0244 |
| | | | 297/216.12 |
| 7,090,292 B2 * | 8/2006 | Dellanno | B60N 2/42709 |
| | | | 297/216.12 |
| 7,695,015 B2 | 4/2010 | Breed | |
| 9,527,421 B2 * | 12/2016 | Hulway | B60N 2/99 |
| 9,713,975 B2 | 7/2017 | Berry et al. | |
| 10,647,286 B1 | 5/2020 | Dennis et al. | |
| 2005/0140190 A1 * | 6/2005 | Kawashima | B60N 2/682 |
| | | | 297/216.14 |
| 2006/0202492 A1 * | 9/2006 | Barvosa-Carter | B60N 2/914 |
| | | | 293/107 |
| 2013/0257119 A1 * | 10/2013 | Roberts | B60N 2/64 |
| | | | 297/216.13 |
| 2014/0316607 A1 | 10/2014 | Le et al. | |
| 2016/0325641 A1 * | 11/2016 | Ohno | B60R 21/207 |
| 2017/0349068 A1 * | 12/2017 | Dry | B60N 2/42709 |
| 2018/0134191 A1 * | 5/2018 | Ketels | B60N 2/0224 |
| 2018/0134192 A1 * | 5/2018 | Wittenschlaeger | B60N 2/70 |
| 2018/0319296 A1 * | 11/2018 | Sasaki | B60N 2/42754 |
| 2019/0344043 A1 * | 11/2019 | Migneco | B60N 2/0244 |
| 2020/0079245 A1 * | 3/2020 | Rowe | B60N 2/22 |
| 2020/0223325 A1 * | 7/2020 | Pinkelman | F03G 7/065 |
| 2020/0282877 A1 * | 9/2020 | Gajda | B60N 2/42709 |
| 2020/0298784 A1 * | 9/2020 | Bonk | B60N 2/4228 |
| 2020/0307433 A1 * | 10/2020 | Nagasawa | B60N 2/42718 |
| 2021/0221263 A1 | 7/2021 | Jost et al. | |

* cited by examiner

OCCUPANT PROTECTION SYSTEM AND METHOD INCLUDING SEATBACK

BACKGROUND

During a vehicle collision, injuries to an occupant of the vehicle may result from the occupant contacting a surface inside the vehicle during the collision. As the difference between the speed of the occupant and the speed of the surface the occupant contacts increases, the force to which the occupant is subjected also increases, thereby increasing the likelihood or severity of injury to the occupant during the collision. Conventional seatbelts and airbags attempt to reduce the effects of collisions by preventing or reducing the likelihood of the occupant contacting an interior surface and/or reducing the difference between the speed of the occupant and the speed of any surface the occupant contacts. However, conventional seatbelts and airbags may not provide sufficient protection to an occupant during certain collision conditions.

BRIEF DESCRIPTION OF THE DRAWINGS

The detailed description is described with reference to the accompanying figures. In the figures, the left-most digit(s) of a reference number identifies/identify the figure in which the reference number first appears. The same reference numbers in different figures indicate similar or identical items.

DETAILED DESCRIPTION

Figure 1:
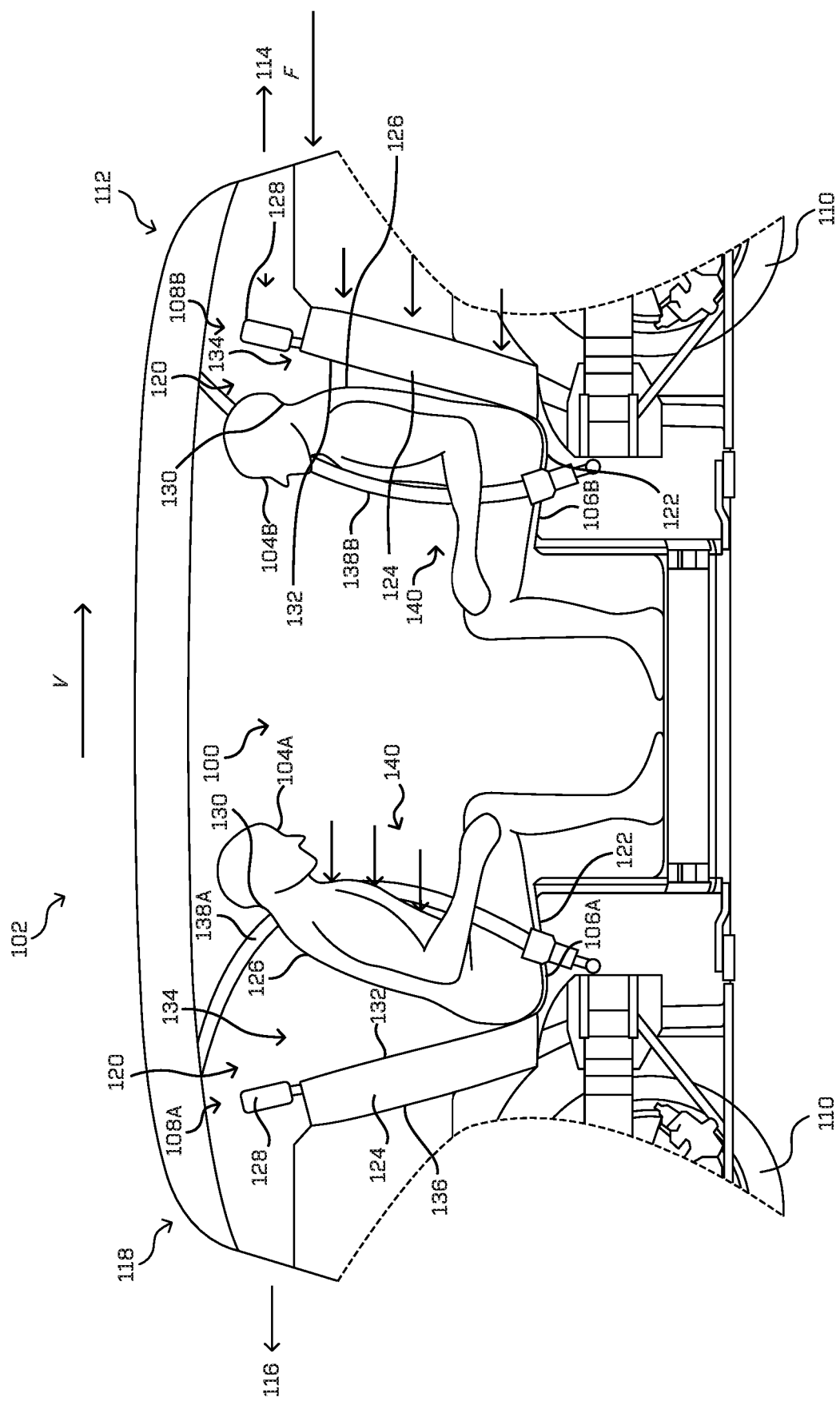
FIG. 1 is a cutaway side view of an example vehicle including an example occupant protection system during a change in velocity consistent with a collision.

As mentioned above, during a vehicle collision, injuries to an occupant of the vehicle may result from the occupant contacting a surface inside the vehicle during the collision. This disclosure is generally directed to an occupant protection system and related methods including a seat having a seatback configured to assist with protecting an occupant during a collision or rapid deceleration of a vehicle in which the occupant is traveling. In some examples, the seatback may include one or more materials and/or a construction configured to rapidly couple the back of the occupant to the seatback and/or subject the back of the occupant to a relatively reduced and/or constant reaction force as at least portions of the seatback compress as the back of the occupant compresses the seatback during deceleration of the occupant, for example, relative to a seatback including only a covering and a relatively soft polyurethane foam cushioning. In some examples, the relatively reduced and/or constant reaction force may be provided by combinations of materials, combinations of layers of materials, and/or crushable elements formed from materials and/or having shapes configured to assist with providing the relatively reduced and/or constant reaction force. In some examples, different zones of the seatback may have different stiffnesses tailored for different parts of the back of the occupant, such as the pelvic region, the lumbar region, the thoracic region, and/or the cervical region. In some examples, the occupant protection system may actively increase pressure associated with the seatback to more rapidly couple the back of the occupant to the seatback and/or actively communicate an electrical charge to a portion of the seatback to change a material characteristic of one or more layers of material in the seatback. Such configurations may be useful for enhancing protection of an occupant during certain types of collisions involving the vehicle and/or during rapid deceleration of the vehicle.

For example, when an occupant is seated in a vehicle facing the same direction as the direction of travel of the vehicle, and a collision occurs from behind the vehicle, for example, when another vehicle collides with a trailing end of the vehicle in which the occupant is traveling, the seatback of the seat in which the occupant is sitting may be propelled into the back of the occupant by the force of the collision. As the difference between the speed of the occupant and the speed of the seatback increases, so does the force of impact absorbed by the occupant, thereby increasing the likelihood or severity of injury to the occupant during the collision. In another example, when an occupant is seated facing a direction opposite the direction of travel of the vehicle and a collision occurs with the leading end of the vehicle, for example, when the leading end of the vehicle collides with another vehicle or object, the back of the occupant is thrown into the seatback of the seat in which the occupant is sitting. As the difference between the speed of the occupant and the speed of the seatback increases, so does the force of impact absorbed by the occupant, thereby increasing the likelihood or severity of injury to the occupant during the collision.

This disclosure is generally directed to apparatuses, systems, and methods for reducing the likelihood and/or severity of injury to an occupant during a collision. In at least some examples, techniques provided herein, may mitigate injuries/damages in which 1) an impact to the trailing end of the vehicle occurs while the occupant is seated facing the direction of travel, or 2) an impact occurs to the leading end of the vehicle while the occupant is seated facing the trailing end of the vehicle (e.g., opposite the direction of travel), though any other direction of travel and occupant position is contemplated.

In some examples, an occupant protection system may include a seat configured to be coupled to a vehicle. The seat may include a seat base configured to support at least a portion of a weight of an occupant of the seat, and a seatback associated with the seat base and configured to provide support to a back of the occupant. The seatback may include a front surface configured to face the back of the occupant and a back surface opposite the front surface. The seatback may also include an intermediate portion between the front surface and the back surface, and the intermediate portion may include a first portion including a first material having a first stiffness, and a second portion including a second material different than the first material, such that a stiffness characteristic of the seatback is relatively greater than the first stiffness of the first material. Although described herein as a first and second material, any number and combination of materials is contemplated. In some examples, the intermediate portion may be configured, such that as at least a portion of the back of the occupant pushes against the front surface of the seatback and the seatback is at least partially compressed, a reaction force from the seatback against the at least a portion of the back of the occupant increases from a minimal reaction force (e.g., a zero reaction force) to a first reaction force corresponding to a first displacement of the front surface of the seatback. In some examples, thereafter the reaction force decreases from the first reaction force to a second reaction force as displacement of the front surface of the seatback further displaces from the first displacement to a second displacement greater than the first displacement. In some examples, the reaction force either gradually increases or remains substantially unchanged relative to the second reaction force as displacement of the front surface of the seatback further increases from the second displacement to a third displacement greater than the second displacement. Some such examples may result in more rapidly coupling at least a portion of the back of the occupant to at least a portion of the seatback, and thereafter, resulting in a relatively constant and/or reduced reaction force being transmitted to at least a portion of the back of the occupant during the compression event, for example, during a collision and/or rapid deceleration of the vehicle.

In some examples, the second portion may include a membrane at least partially enclosing a third portion that includes a third material within the membrane, and the third material may have a third stiffness greater than the first stiffness. For example, the first material may include a first foam material (e.g., a polyurethane foam or other material having at least similar characteristics), and the third material may include a second foam material having a stiffness greater than the first stiffness of the first foam material (e.g., a polypropylene foam or other material having at least similar characteristics).

In some examples, the occupant protection system may also include a seat actuator system. The seat actuator system may include an actuator controller and/or a seat actuator configured to move at least a portion of the seat (e.g., the seat base, the seatback, a surface of the seatback, and/or the headrest) toward at least a portion of the back of the occupant of the vehicle. In some examples, the seat actuator may be configured to move one or more of the different portions of the seat differently (e.g., through different ranges of motion, through different ranges of angles of motion, and/or at different rates of motion). The seat actuator system may also include an actuator controller in communication with the seat actuator and configured to receive a triggering signal indicative of one or more of an actual change in velocity of the vehicle or a predicted change in velocity of the vehicle. In some examples, the triggering signal may be indicative of an actual collision and/or a predicted collision involving the vehicle (e.g., as may be determined based on one or more systems or subsystems of the vehicle (perception, prediction, etc., for example, as explained herein)). The actuator controller may also be configured to cause, based at least in part on the triggering signal, the seat actuator to move at least a portion of the seat (e.g., a portion of the seatback) toward at least a portion of the back of the occupant, for example, in a direction opposite a direction of travel of the vehicle. In some examples, the movement of the at least a portion of the seat may be a translational movement, for example, not including a pivoting of the seat itself or a pivoting of the seatback relative to the seat base. In some examples, the seat actuator may include an expansion device in flow communication with an interior of the membrane of the seatback and configured to increase pressure in the interior of the membrane. For example, the expansion device may include, for example, a compressor, a pump, a gas generator, a pyrotechnic charge, propellants, and/or any combination thereof. In some such examples, the seat actuator may be configured to cause at least a portion of a seat in which an occupant is seated to move toward the back of the occupant before, during, and/or after the collision. In some examples, the portion of the seat that is moved toward the back of the occupant may include the seatback (e.g., a portion of the seatback), the seat bottom, and/or the headrest. This may serve to reduce the likelihood and/or severity of injury to the occupant during certain types of collisions.

For example, when seated in a vehicle seat, a space may exist between at least a portion of a back of an occupant of the seat and a front surface of a seatback of the seat facing the back of the occupant. When a collision occurs to the trailing end of the vehicle with the occupant facing forward, the front surface of the seatback is propelled through the space and into the back of the occupant. By engaging the occupant with the portion of the seat sooner, or in effect coupling the occupant to the vehicle, the force of impact can be absorbed over a greater distance and a longer period of time, as well as decreasing the maximum rate of change of speed (i.e., the deceleration) of the occupant and minimizing the reaction force applied to the occupant.

When a collision to the leading end of the vehicle occurs with the occupant seated facing the trailing end of the vehicle relative to the direction of travel, as the seatback slows or stops as a result of the collision, the back of the occupant continues to travel through the space and toward the front surface of the seatback. The force absorbed by the back of the occupant increases as the rate of change of the velocity resulting from the impact with the seatback increases. In some examples, by moving a portion of the seat (e.g., the seatback, the seat bottom, and/or the headrest) toward the back of the occupant before, during, and/or after the collision, for example, to eliminate or minimize the space, the maximum rate of change of the velocity is reduced, thereby reducing the likelihood and/or severity of injury suffered by the occupant during such collisions.

In some examples, the membrane of the seatback may define at least one vent configured to release pressure inside the membrane during compression of the seatback. For example, the at least one vent may be configured to affect the stiffness characteristic of the seatback during compression of the seatback. In some examples, the at least one vent may be configured as one or more valves configured for controlled passage of air and/or fluid (e.g., a gas and/or fluid) through the one or more valves. In some examples, the one or more valves may be configured (e.g., via size and/or adjustment)

to provide a desired stiffness characteristic for the seatback. In some examples, the at least one vent may be configured as one or more perforations in the membrane configured for controlled passage of air and/or fluid through the perforations. In some examples, the one or more perforations may be tailored (e.g., via size, shape, location, and/or number) to provide a desired stiffness characteristic for the seatback.

In some examples, the seatback may further include at least one crushable element between the second portion and the back surface of the seatback. The at least one crushable element may be configured to compress as the second material compresses and a stiffness of the second material increases. For example, the second portion may include a layer of material (e.g., a foam material), and the at least one crushable element may include a first crushable element and a second crushable element, and a shape, a thickness, a construction, a stiffness, and/or a material of the first crushable element and the second crushable element may differ from one another. In some examples, the at least one crushable element may be configured to compress in an at least partially non-resilient manner and reduce the reaction forces applied against at least a portion of the back of the occupant. In some examples, the at least one crushable element may include a first crushable zone having a first crush stiffness and a second crushable zone having a second crush stiffness greater than the first crush stiffness. For example, the shape, thickness, construction, stiffness, and/or material(s) of the at least one crushable element may be varied across the area of the seatback, for example, to tune the stiffness of the seatback according to different parts of the back of the occupant, such as, for example, the pelvic region, the lumbar region, the thoracic region, and/or the cervical region. This may facilitate protecting different parts of the back of the occupant according to anatomical differences of the different anatomical parts of the occupant.

In some examples, the seatback may include a damping layer between the at least one crushable element and the back surface of the seatback. In some examples, the damping layer may be configured to at least partially equalize reaction forces communicated across an area corresponding to at least a portion of the back of the occupant. In some examples, the damping layer may be configured to reduce peak forces that may be transmitted to portions of the back of the occupant, for example, which may result from the anatomy of the occupant (e.g., shoulder blades, the spine, etc.) and/or from one or more of the crushable elements (e.g., due to the shape, thickness, construction, and/or materials of the crushable elements). In some examples, the damping layer may include a gel-like material.

In some examples, the gel-like material may be configured change at least one material characteristic upon receipt of an electrical charge, such as, for example, stimuli-responsive gels (e.g., hydrogels). In some examples, the gel-like material may be complimented by, or replaced with, other materials that change at least one material characteristic upon receipt of an electrical charge, such as, for example, electroactive polymers that may change size and/or shape when stimulated by an electric field, including, for example, dielectric electroactive polymers, ferroelectric polymers (e.g., polyvinylidene fluoride (PVDF)), electrostrictive graft polymers, liquid crystalline polymers, ionic electroactive polymers, electrorheological fluid, ionic polymer-metal composites (e.g., Nafion and/or Flemion), etc. In some examples, the occupant protection system may include a seat actuator system and/or an actuator controller configured to control operation of a seat actuator associated with the seat. In some such examples, the seat actuator may include a source of electrical energy and may be configured to communicate the electrical charge to the damping layer in order change one or more material characteristics associated with the gel-like material of the damping layer. For example, the seat actuator system may be configured to trigger communication of the electrical charge immediately prior to a collision or rapid deceleration of the vehicle, for example, to activate the damping layer to harden it relative to its un-activated state, so that an initial reaction force is relatively greater, and thereafter, cease communication of the electrical charge to the damping layer, so that the damping layer softens (relative to the activated and hardened damping layer). In some examples, this may result in a relatively more rapid coupling of the occupant to the seatback, and thereafter, a relatively reduced and/or more constant reaction force being transmitted to at least a portion of the back of the occupant during compression of the seatback.

The techniques and systems described herein may be implemented in a number of ways. Example implementations are provided below with reference to the figures.

FIG. 1 is a side cutaway view showing an interior 100 of an example vehicle 102 including a pair of occupants 104 (e.g., occupants 104A and 104B) during a change in velocity consistent with a collision, such as, for example, a predicted or actual change in velocity, and/or a predicted collision or an actual collision involving the vehicle 102. The example vehicle 102 may be configured to travel via a road network from one geographic location to a destination carrying one or more of the occupants 104. For example, the interior 100 may include a plurality of seats 106 (e.g., seats 106A and 106B), which may be provided in any relative arrangement. The example vehicle 102 shown in FIG. 1 includes an example carriage-style seating arrangement in a substantially central portion of the interior 100 of the vehicle 102. For example, the vehicle 102 may include two or more rows 108 (e.g., rows 108A and 108B) of seats 106, and in some examples, two of the rows 108 of seats 106 may face each other, for example, as shown in FIG. 1. One or more of the rows 108 of seats 106 may include two seats 106. In some examples, one or more of the two seats 106 may be a bench-style seat configured to provide seating for one or more occupants 104. Other relative arrangements and numbers of seats 106 are contemplated.

For the purpose of illustration, the vehicle 102 may be a driverless vehicle, such as an autonomous vehicle configured to operate according to a Level 5 classification issued by the U.S. National Highway Traffic Safety Administration, which describes a vehicle capable of performing all safety-critical functions for the entire trip, with the driver (or occupant) not being expected to control the vehicle at any time. In such examples, because the vehicle 102 may be configured to control all functions from start to completion of the trip, including all parking functions, it may not include a driver and/or controls for driving the vehicle 102, such as a steering wheel, an acceleration pedal, and/or a brake pedal. This is merely an example, and the systems and methods described herein may be incorporated into any ground-borne, airborne, or waterborne vehicle, including those ranging from vehicles that need to be manually controlled by a driver at all times, to those that are partially- or fully-autonomously controlled.

The example vehicle 102 may be any configuration of vehicle, such as, for example, a van, a sport utility vehicle, a cross-over vehicle, a truck, a bus, an agricultural vehicle, and a construction vehicle. The vehicle 102 may be powered by one or more internal combustion engines, one or more electric motors, hydrogen power, any combination thereof, and/or any other suitable power sources. Although the example vehicle 102 has four wheels 110, the systems and methods described herein may be incorporated into vehicles having fewer or a greater number of wheels, tires, and/or tracks. The example vehicle 102 may have four-wheel steering and may operate generally with equal performance characteristics in all directions, for example, such that a first end 112 of the vehicle 102 is the leading end of the vehicle 102 when travelling in a first direction 114, and such that the first end 112 becomes the trailing end of the vehicle 102 when traveling in the opposite, second direction 116, as shown in FIG. 1. Similarly, a second end 118 of the vehicle 102 is the leading end of the vehicle 102 when travelling in the second direction 116, and such that the second end 118 becomes the trailing end of the vehicle 102 when traveling in the opposite, first direction 114. These example characteristics may facilitate greater maneuverability, for example, in small spaces or crowded environments, such as parking lots and urban areas.

As shown in FIG. 1, the vehicle 102 may include an occupant protection system 120 configured to protect one or more of the occupants 104 during a collision involving the vehicle 102. In some examples, the occupant protection system 120 may include, or be incorporated into, one or more portions of one or more of the seats 106 (e.g., a seat base, a seatback, and/or a headrest). For example, as shown in FIG. 1, each of the example seats 106 includes a seat base 122 configured to support at least a portion of a weight of an occupant 104, a seatback 124 associated with the seat base 122 (e.g., coupled to and/or adjacent to the seat base 122) and configured to provide support to a back 126 of an occupant 104 of the seat 120, and a headrest 128 associated with the seatback 124 (e.g., coupled to and/or adjacent to the seatback 124) and configured to provide support to a head and/or neck 130 of an occupant 104 of the seat 120. When seated, a portion of the back 126 of the occupant 104 may be spaced from a front surface 132 of the seatback 124 by a space 134. The seatback 124 of one or more of the seats 106 may include a back surface 136, which may be formed as part of the seatback 124 and/or, in some examples, may be coupled to, adjacent to, and/or at least partially formed by, a portion of the interior 100 of the vehicle 102. In some examples, the occupant protection system 120 may be provided at each seat 106, at each row 108 of seats 106, and/or only at individual seats 106 or rows 108 of seats 106.

As shown in FIG. 1, as the vehicle 102 begins to change velocity, for example, reduce its velocity due to braking and/or due to a collision with an object with the first end 112 of the vehicle 102, the occupant 104A is restrained by a seatbelt 138A of a seatbelt system 140, which may prevent the occupant 104A from being thrown from the seat 106A toward the occupant 104B and/or the seat 106B. Although the occupant 104B is wearing a seatbelt 138B, the seatbelt 138B, at least initially, does not restrain the occupant 104B during the change in velocity and/or collision. Rather, at least the back 126 of the occupant 104B will be thrown toward the front surface 132 of the seatback 124 in the direction of travel, at least unless, or until, the back 126 of the occupant 104B contacts the front surface 132 of the seatback 124.

FIG. 1 depicts an example triggering event, such as, for example, a predicted or actual change in velocity, and/or a predicted collision or an actual collision. As shown in FIG. 1, the vehicle 102 is travelling at a velocity V in the first direction 114. A force F opposing the direction of travel is applied to the first end 112 of the vehicle 102 in a direction generally consistent with the second direction 116. The occupant 104A is seated in the seat 106A facing in the direction of travel (i.e., the first direction 114), and the occupant 104B is seated in the seat 106B facing opposite the direction of travel, for example, with the back 126 of the occupant 104B facing the front surface 132 of the seatback 124. Prior to the collision, the back of the occupant 104B is spaced from the front surface 132 of the seatback 124 creating a space 134 therebetween.

Due in part to the space 134 between the back 126 of the occupant 104B and the front surface 132 of the seatback 124 of the seat 106B, the velocity of the back 126 of the occupant 104B will be substantially the same as the velocity of the vehicle 102 immediately prior to the reduction of the velocity of the vehicle 102 due to braking and/or the collision. The velocity of the back 126 of the occupant 104B will continue at this velocity until the back 126 of the occupant 104B contacts the front surface 132 of the seatback 124, at which time, the velocity of the back 126 of the occupant 104B will be subjected to an abrupt change in velocity as the seatback 124 stops the motion of the back 126 of the occupant 104B. This abrupt change in velocity may increase the likelihood and/or the severity of injury to the occupant 104B due to the collision. In some examples, the seatback 124 may be configured to quickly be coupled to the back 126 of the occupant 104B, and thereafter, the materials and/or structure of the seatback 124 may be configured, such that a reaction force against the back 126 of the occupant 104B is reduced and/or substantially constant during compression of the seatback 124, for example, through a range of the compression of the seatback 124.

Figure 2A:
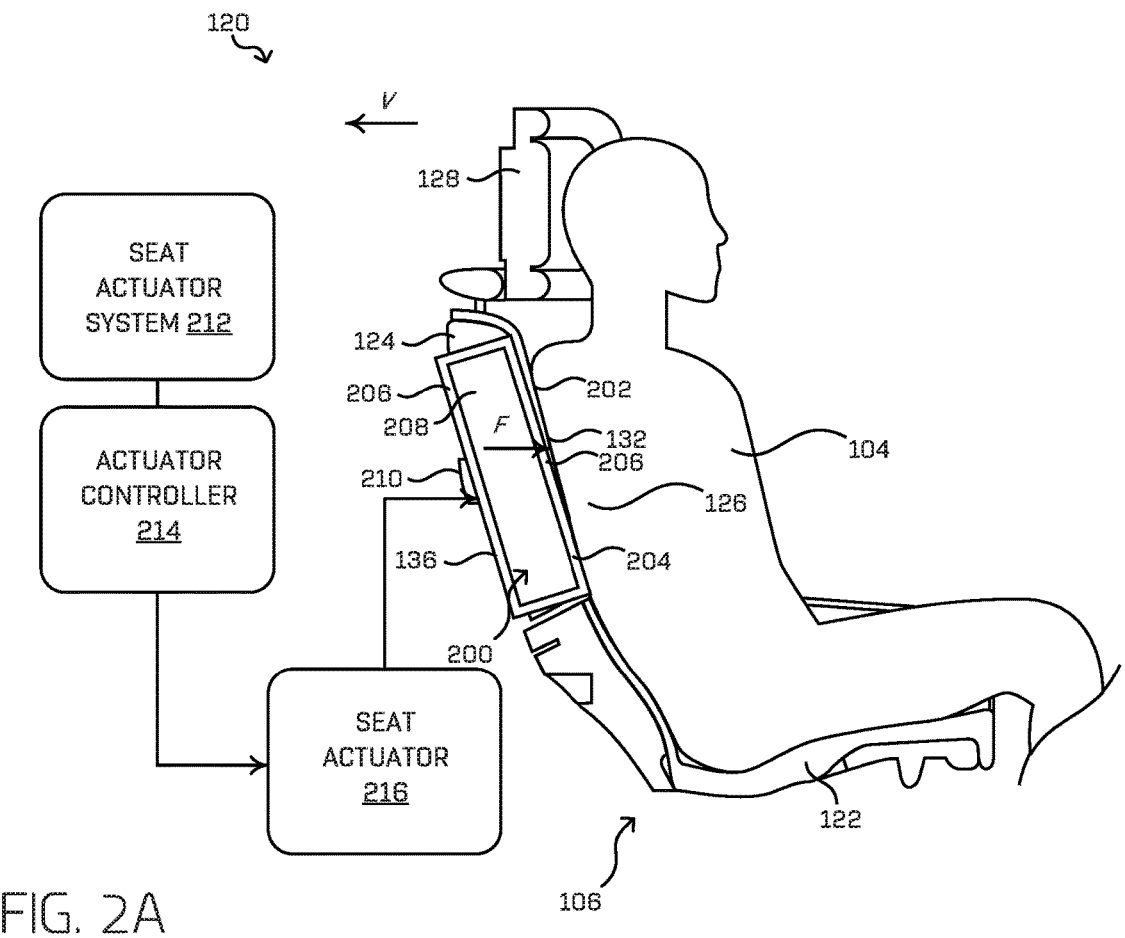
FIG. 2A is a schematic side view of an occupant in a seat during a collision in which the occupant is facing a direction opposite the direction of travel of the vehicle, with an example occupant protection system including an example seatback.
Figure 2B:
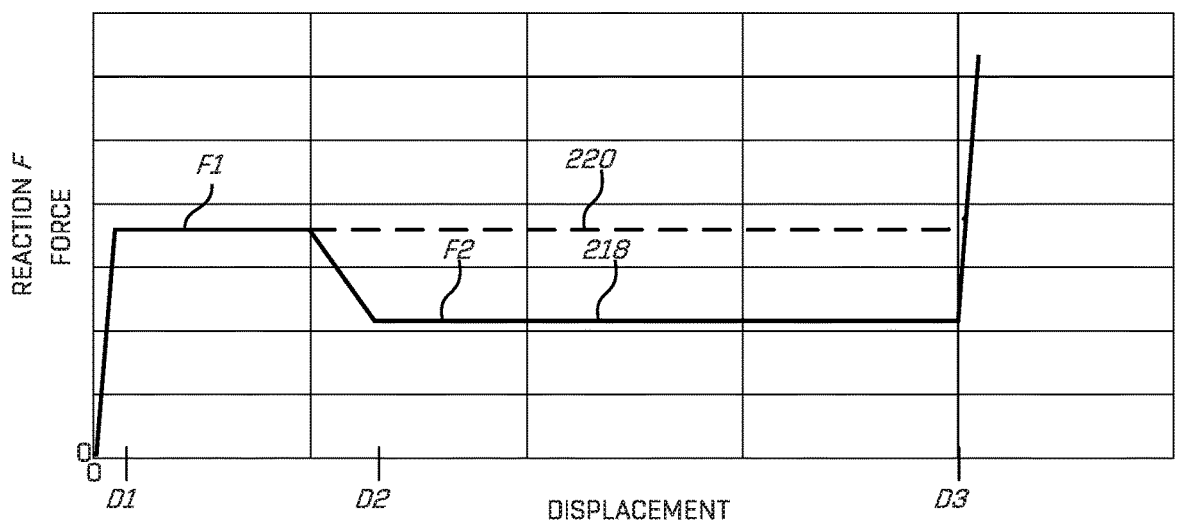
FIG. 2B is a graph of an example reaction force profile showing the reaction force exhibited by the example occupant protection system shown in FIG. 2A as a function of displacement of a front surface of the seatback toward a back surface of the seatback.

FIG. 2A is a schematic side view of an occupant 104 in a seat 106 during a collision in which the occupant 104 is facing a direction opposite the direction of travel of the vehicle 102, with an example occupant protection system 120 including a seatback 124 configured to protect the occupant 104. FIG. 2B depicts a graph showing the magnitude of a reaction force F generated, and to which at least a portion of the back 126 of the occupant 104 is subjected, as a function of the displacement of the front surface 132 of the seatback 124 for at least some examples consistent with the example shown in FIG. 2A.

The example seat 106 shown in FIG. 2A includes an example seat base 122 configured to support at least a portion of a weight of the occupant 104 of the seat 106, and an example seatback 124 associated with (e.g., coupled to) the seat base 122 and configured to provide support to at least a portion of the back 126 of the occupant 104. In the example shown in FIG. 2A, the example seatback 124 includes an intermediate portion 200 between the front surface 132 and the back surface 136 of the seatback 124. In some examples, the intermediate portion 200 may include a first portion 202 including a first material having a first stiffness. For example, the first portion 202 may be configured as one or more layers and/or sections of foam and/or foam-like material having a first stiffness. For example, the first material may include a polyurethane foam (e.g., a high-stiffness and/or high-density polyurethane foam or one or more materials having similar characteristics (e.g., having a similar stiffness characteristics)).

The intermediate portion 200 may also include a second portion 204 including a second material different than the first material, such that the stiffness characteristic of the seatback 124 is relatively greater than the first stiffness of the first material of the first portion 202. For example, the second portion 204 may be configured as a membrane 206 that may form a cavity at least partially enclosing a third portion 208 within the membrane 206, for example, as shown in FIG. 2A. In some examples, the third portion 208 may include a third material having a stiffness greater than the first stiffness of the first portion 202. For example, the third material of the third portion 208 may include a second foam material (e.g., polypropylene foam or a material having similar characteristics (e.g., having a similar stiffness characteristics)). In some examples, the third portion 208 may be in the form of a block of material and/or a number of layers of material. The membrane 206 may be formed from an impermeable, semi-permeable, and/or permeable material, such that flow of air and/or fluid (e.g., a gas and/or a liquid) through the membrane 206 may be at least partially inhibited.

In some examples, the membrane 206 may define and/or include at least one vent 210 configured to release pressure inside the membrane 206 during compression of the seatback 124. For example, the at least one vent 210 may be configured to affect the stiffness characteristic of the seatback 124 during compression of the seatback 124. In some examples, the at least one vent 210 may be configured as one or more valves configured for controlled passage of air and/or fluid (e.g., a gas and/or fluid) through the one or more valves. In some examples, the one or more valves may be configured (e.g., via size and/or adjustment) to provide a desired stiffness characteristic for the seatback 124, for example, such that, in combination with the first portion 202 and/or the third portion 208 of the seatback 124, as at least a portion of the back 126 of the occupant 104 pushes against the front surface 132 of the seatback 124 and the seatback 124 is at least partially compressed, a reaction force from the seatback 124 against the portion of the back 126 of the occupant 104 increases from a minimal reaction force (e.g., zero force) to a first reaction force corresponding to a first displacement of the front surface of the seatback, for example, as explained herein with respect to FIG. 2B. Thereafter, in some examples consistent with the example shown in FIG. 2A, the reaction force decreases from the first reaction force to a second reaction force as displacement of the front surface 132 of the seatback 124 further displaces from the first displacement to a second displacement greater than the first displacement. In some examples consistent with FIG. 2A, the reaction force either gradually increases or remains substantially unchanged relative to the second reaction force as displacement of the front surface 132 of the seatback 124 further displaces from the second displacement to a third displacement greater than the second displacement. Some examples consistent with the example seatback 124 shown in FIG. 2A may result in more rapidly coupling at least a portion of the back 126 of the occupant 104 to at least a portion of the seatback 124, and thereafter, resulting in a relatively constant and/or reduced reaction force being transmitted to at least a portion of the back 126 of the occupant 104 during the compression event, for example, during a collision and/or rapid deceleration of the vehicle 102.

In some examples, the at least one vent 210 may be configured as one or more perforations in the membrane 206 configured for controlled passage of air and/or fluid through the perforations. In some examples, the one or more perforations may be tailored (e.g., via size, shape, location, and/or number) to provide a desired stiffness characteristic for the seatback 124, for example, such that, in combination with the first portion 202 and/or the third portion 208 of the seatback 124, the seatback 124 exhibits characteristics consistent with those previously mentioned.

For example, FIG. 2B is a graph showing the magnitude of two example reaction force profiles 218 and 220 generated, and to which at least a portion of the back 126 of the occupant 104 is subjected, as a function of displacement of the front surface 132 of the seatback 124 relative to the back surface 136 of the seatback 124 for at least some examples consistent with the example shown in FIG. 2A. As shown in FIG. 2B, for the example reaction force profile 218, the example seatback 124 shown in FIG. 2A exhibits a reaction force F from the seatback 124 against the at least a portion of the back 126 of the occupant 104 that increases from a minimal reaction force (e.g., a zero reaction force F) to a first reaction force F1 corresponding to a first displacement D1 of the front surface 132 of the seatback 124, and thereafter the reaction force decreases from the first reaction force F1 to a second reaction force F2 as displacement of the front surface 132 of the seatback 124 further displaces from the first displacement D1 to a second displacement D2 greater than the first displacement D1. In some examples according to the reaction force profile 218, as shown in FIG. 2B, the reaction force F may remain substantially unchanged relative to the second reaction force F2 as displacement of the front surface 132 of the seatback 124 further displaces from the second displacement D2 to a third displacement D3 greater than the second displacement D2. Some such examples may result in a relatively constant reaction force F being transmitted to at least a portion of the back 126 of the occupant 104 during the compression event (e.g., during a collision and/or a rapid deceleration of the vehicle 102). In some examples according to the example reaction force profile 220, the example seatback 124 may exhibits a reaction force F from the seatback 124 against the at least a portion of the back 126 of the occupant 104 that increases from a minimal reaction force (e.g., a zero reaction force F) to the first reaction force F1 corresponding to the first displacement D1 of the front surface 132 of the seatback 124, and thereafter the reaction force remains substantially constant as displacement of the front surface 132 of the seatback 124 further displaces from the first displacement D1 through the second displacement D2 and thereafter remain substantially unchanged as displacement of the front surface 132 of the seatback 124 further displaces from the second displacement D2 to the third displacement D3. In some examples, the reaction force F may gradually increase relative to the second reaction force F2 as displacement of the front surface 132 of the seatback 124 further displaces from the second displacement D2 to the third displacement D3. In some examples, the magnitude of the reaction force F may vary across the area of the back 126 of the occupant 104 due, for example, to different anatomical areas of the occupant 104 (e.g., to accommodate and/or improve protection of the pelvic, lumbar, thoracic, and/or cervical areas, the shoulder blades, etc.). In some such examples, although the magnitude of the reaction force F may vary, the reaction force profile may remain relative consistent across the area of the back 126 of the occupant 104.

In contrast, if the seatback 124 included only the first portion 202 (e.g., a relatively soft foam, such as, for example, a polyurethane foam covered by a thin covering such as cloth, leather, and/or vinyl), the reaction force F of the first portion 202, by itself, would initially increase to level lower than the reaction force F1 and thereafter remain substantially at the lower level until the displacement approached a maximum displacement of the first portion 132, after which it would increase dramatically as the seatback 124 became almost fully compressed. Because the area under the curve corresponding to a seatback including the only the first portion 202 would be expected to be much less than the area under the curve corresponding to seatbacks 124 consistent with the example seatback 124 shown in FIG. 2A and the reaction force profiles 218 and 220 shown in FIG. 2B, the first portion 202, by itself, would provide very little energy absorption for the back 126 of the occupant 104 during a collision event relative to the example seatback 124. In addition, the seatback 124, in at least some examples, as a result of the more quickly rising reaction force F, may result in coupling at least a portion of the back 126 of the occupant 104 to the seatback 124 and its protection much more quickly than a seatback including only the first portion 202. If the seatback 124 included only the third portion 208 (e.g., a relatively stiffer foam, such as, for example, a polypropylene foam), the reaction force F of the third portion 208, by itself, would initially increase quickly to level equaling or exceeding the reaction force F1 and thereafter remain substantially constant or gradually increase until increasing dramatically again as the displacement of the front surface 132 of the seatback 124 increased beyond halfway compressed. Although this latter hypothetical construction might result in relatively more energy absorption than examples consistent with the example seatback 124 shown in FIG. 2A, the resulting seatback would transmit relatively more force to at least a portion of the back 126 of the occupant 104 as the compression of the seatback increased, which might result in increasing the likelihood and/or severity of injury to the occupant 104 relative to the example seatback 124 shown in FIG. 2A.

As shown in FIG. 2A, some examples of the occupant protection system 120 may include a seat actuator system 212 including an actuator controller 214 configured to cause at least a portion of the seatback 124 (and/or another portion of the seat 106) to move toward at least a portion of the back 126 of the occupant 104. In some examples, the actuator controller 214 may be configured to receive one or more signals from one or more sensors indicative of a predicted collision or an actual collision, and based at least in part on the one or more signals, cause a seat actuator 216 to move at least a portion of the seatback 124 toward at least a portion of the back 126 of the occupant 104, for example, as described herein. The actuator controller 214 may receive one or more signals indicative of parameters other than the one or more signals indicative of a predicted or actual collision, and, based at least in part on the one or more signals indicative of the other parameters, cause the seat actuator 216 to move at least a portion of the seatback 124 toward at least a portion of the back 126 of the occupant 104. For example, the seat actuator 216 may include an expansion device in flow communication with an interior of the membrane 206 and configured to increase pressure in the interior of the membrane 206. In some examples, the expansion device may include, for example, a compressor, a pump, a gas generator, a pyrotechnic charge, propellants, any combination thereof, and/or any other suitable devices or systems.

In some examples, the seat actuator system 212 may be configured to move the front surface 132 of the seatback 124 of the seat 106 toward at least a portion of the back 126 of the occupant 104 before, during, and/or after the reduction in velocity of the vehicle 102 due to braking and/or the collision. In at least some examples, this may result in coupling at least a portion of the back 126 of the occupant 104 and the seatback 124 to one another, which may assist with reducing a maximum rate of change of the velocity of at least a portion of the back 126 of the occupant 104 before, during, and/or after the collision, which may result in reducing the likelihood and/or severity of injury to the occupant 104.

Figure 3:
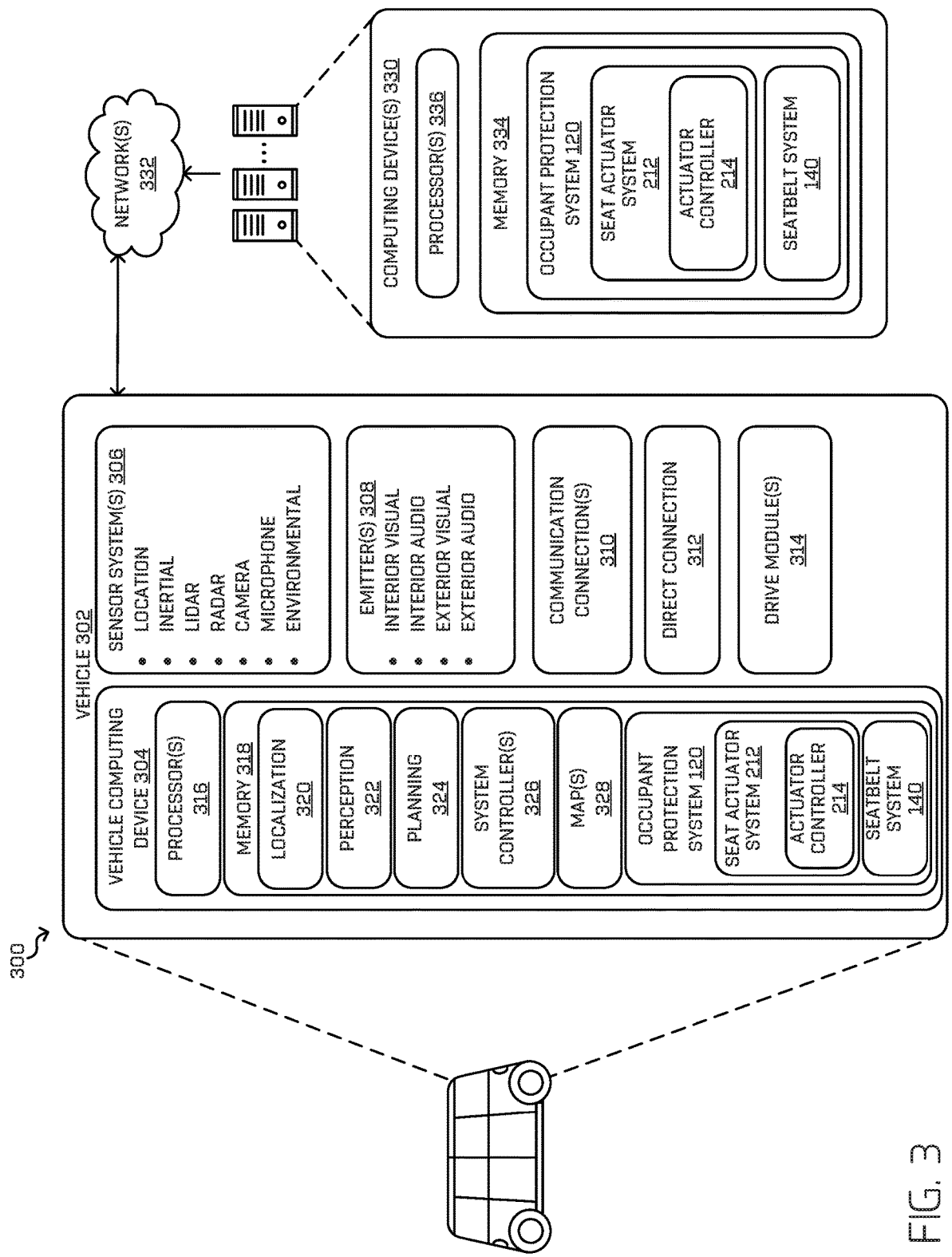
FIG. 3 is a block diagram of an example system architecture for implementing the example techniques described herein.

In some examples, the seat actuator system 212 may be in communication with one or more systems of the vehicle 102 and may be configured to activate the seat actuator 216 based at least in part, for example, on one or more signals received from the other systems of the vehicle 102. For example, FIG. 3 depicts a block diagram of an example system 300 for implementing the techniques described herein. In at least some examples, the system 300 may include a vehicle 302, which may correspond to the example vehicle 102 shown in FIG. 1. The vehicle 302 may include a vehicle computing device 304, one or more sensor system(s) 306, one or more emitters 308, one or more communication connections 310, at least one direct connection 312, and one or more drive modules 314. The vehicle computing device 304 may include one or more processors 316 and memory 318 communicatively coupled with the one or more processors 316. In the illustrated example, the vehicle 302 is an autonomous vehicle. However, the vehicle 302 may be any other type of vehicle. In the illustrated example, the memory 318 of the vehicle computing device 304 stores a localization component 320, a perception component 322, a planning component 324, one or more system controllers 326, one or more map(s) 328, and an example occupant protection system 120. Though depicted in FIG. 3 as residing in memory 318 for illustrative purposes, it is contemplated that the localization component 320, the perception component 322, the planning component 324, the one or more system controllers 326, the one or more maps 328, and the occupant protection system 120 may additionally, or alternatively, be accessible to the vehicle 302 (e.g., stored on, or otherwise accessible by, memory remote from the vehicle 302).

In some examples, the one or more of sensor system(s) 306, the localization component 320, the perception component 322, or the planning component 324 may generate one or more triggering signals indicative of one or more of an actual change in velocity of the vehicle 302 or a predicted change in velocity of the vehicle 302, for example, due to a predicted collision or actual collision involving the vehicle 302. For example, one or more of the sensor system(s) 306 may generate one or more signals indicative of an object (e.g., another vehicle, a wall, a guardrail, a bridge support, a utility pole, and/or a pedestrian) and communicate the one or more signals to the perception component 322 and/or the planning component 324, which may predict a collision with an object in the environment through which the vehicle 302 is travelling. The perception component 322 and/or planning component 324 may provide information to the seat actuator system 212, which in turn, provides one or more signals to the actuator controller 214, which may activate the seat actuator 216 cause the front surface 132 of the seatback 124 to move toward at least a portion of the back 126 of the occupant 104, for example, as described herein. As described herein, in some examples, the seat actuator 216 may cause an increase in pressure inside the membrane 206, thereby assisting with coupling of at least a portion of the back 126 of the occupant 104 with the seatback 124 and/or increasing an initial reaction force F to which the occupant 104 is subject upon coupling with the seatback 124.

In some examples, the seat actuator system 212 may be configured to receive one or more occupant presence signals indicative of a presence of an occupant 104 in a seat 106. In some such examples, the actuator controller 214 may be configured to cause, based at least in part on the one or more occupant presence signals, the seat actuator 216 to move the at least a portion of the seatback 124 of the seat 106 toward at least a portion of the back 126 of the occupant 104, for example, in a direction opposite a direction of travel of the vehicle 302. In some examples, the seat actuator system 212 may be further configured to determine, based at least in part on the occupant presence signal, that the occupant 104 is facing rearward (e.g., opposite relative to a direction of travel of the vehicle 302), and cause, based at least in part on determining that the occupant 104 is facing rearward, the seat actuator 216 to increase pressure in the membrane and/or to move at least a portion of the seatback 124 of the seat 106 toward at least a portion of the back 126 of the occupant 104. In some examples, the movement of the at least a portion the seat or seatback 124 may be a translational movement, for example, not including a pivoting of the seat 106 itself or a pivoting of the seatback 124 relative to the seat base 122. For example, the perception component 322 of the vehicle 302 may include an object classification system configured to determine information related, for example, to whether an occupant 104 is present in one or more of the respective seats 106 of the vehicle 302. In some examples, the object classification system may leverage one or more of the sensor system(s) 306 of the vehicle 302 and determine information about the occupant 104, such as, for example, the size and/or weight of the occupant 104 (e.g., whether the occupant 104 is an adult, a child, or an infant). For example, image systems (e.g., cameras) internal to the vehicle 302 may determine presence of an occupant 104 in a seat 106. If, for example, no occupant 104 is present in a seat 106, the actuator controller 214 may not activate the seat actuator 216. This may prevent unnecessary activation and prevent costs associated with servicing activated parts of the occupant protection system 120. Alternatively, if an occupant 104 is present in the seat 106, the actuator controller 214 may activate a seat actuator 216 associated with the position of the occupant 104 to protect the occupant 104 during the collision. In at least some examples, the type of occupant 104 detected may be used to inform other parameters of such a system (e.g., lower activation rates for child occupants, etc.). In some examples, the seat actuator system 212 may be further configured to determine, based at least in part on the occupant presence signal, that the occupant 104 is facing forward (e.g., facing the same direction as a direction of travel of the vehicle 302), and cause, based at least in part on determining that the occupant 104 is facing forward, the seat actuator 216 to move at least a portion of the seatback 124 of the seat 106 toward at least a portion of the back 126 of the occupant 104.

The seat actuator system 212, in some examples, may be configured to receive one or more direction signals indicative of a direction of travel of the vehicle 302, and cause, based at least in part on the direction signal, the seat actuator 216 to increase the pressure in the membrane 206 and/or to move at least a portion of the seatback 124 the seat 106 toward at least a portion of the back 126 of the occupant 104. For example, the vehicle 302 may be a bi-directional vehicle configured to travel between locations with either end of the vehicle 302 being the leading end, for example, as described herein with respect to FIG. 1. In such vehicles, a seat 106 may be facing the direction of travel when the vehicle 302 is traveling with one end of the vehicle 302 being the leading end, but with the seat 106 facing rearward with the other end of the vehicle 302 being the leading end. The vehicle 302 may include sensors and/or a system configured to generate one or more signals indicative of whether the vehicle 302 is traveling in a direction such that the seat 106 is facing forward (i.e., in the direction of travel) or the seat 106 is facing rearward (i.e., opposite the direction of travel). The seat actuator system 212 may be configured to prevent activation of the seat actuator 216 associated with the seat 106, even when occupied, for example, when the seat 106 is facing forward based at least in part on the signals. This may prevent unnecessary activation and costs associated with servicing activated parts of the occupant protection system 120. Alternatively, if the seat 106 is facing rearward and an occupant 104 is present in the seat 106, the actuator controller 214 may activate the seat actuator 216 associated with the position of the seat 106 to protect the occupant 104 during the collision, for example, as described herein.

Regarding the example system 300 shown in FIG. 3, in at least some examples, the localization component 320 may be configured to receive data from the sensor system(s) 306 to determine a position and/or orientation of the vehicle 302 (e.g., one or more of an x-, y-, z-position, roll, pitch, or yaw). For example, the localization component 320 may include and/or request/receive a map of an environment and may continuously determine a location and/or orientation of the autonomous vehicle within the map. In some examples, the localization component 320 may utilize SLAM (simultaneous localization and mapping), CLAMS (calibration, localization and mapping, simultaneously), relative SLAM, bundle adjustment, non-linear least squares optimization, or the like to receive image data, LIDAR sensor data, radar data, IMU data, GPS data, wheel encoder data, and the like to accurately determine a location of the autonomous vehicle. In some examples, the localization component 320 may provide data to various components of the vehicle 302 to determine an initial position of an autonomous vehicle for generating a candidate trajectory, as discussed herein.

In some examples, the perception component 322 may be configured to perform object detection, segmentation, and/or classification. In some examples, the perception component 322 may provide processed sensor data that indicates a presence of an entity that is proximate to the vehicle 302 and/or a classification of the entity as an entity type (e.g., car, pedestrian, cyclist, animal, building, tree, road surface, curb, sidewalk, unknown, etc.). In additional and/or alternative examples, the perception component 322 may provide processed sensor data that indicates one or more characteristics associated with a detected entity and/or the environment in which the entity is positioned. In some examples, characteristics associated with an entity may include, but are not limited to, an x-position (global position), a y-position (global position), a z-position (global position), an orientation (e.g., a roll, pitch, yaw), an entity type (e.g., a classification), a velocity of the entity, an acceleration of the entity, an extent of the entity (size), etc. Characteristics associated with the environment may include, but are not limited to, a presence of another entity in the environment, a state of another entity in the environment, a time of day, a day of a week, a season, a weather condition, an indication of darkness/light, etc.

In general, the planning component 324 may determine a path for the vehicle 302 to follow to traverse through an environment. For example, the planning component 324 may determine various routes and trajectories and various levels of detail. For example, the planning component 324 may determine a route to travel from a first location (e.g., a current location) to a second location (e.g., a target location). For the purpose of this discussion, a route may be a sequence of waypoints for travelling between two locations. As non-limiting examples, waypoints include streets, intersections, global positioning system (GPS) coordinates, etc. Further, the planning component 324 may generate an instruction for guiding the autonomous vehicle along at least a portion of the route from the first location to the second location. In at least one example, the planning component 324 may determine how to guide the autonomous vehicle from a first waypoint in the sequence of waypoints to a second waypoint in the sequence of waypoints. In some examples, the instruction may be a trajectory or a portion of a trajectory. In some examples, multiple trajectories may be substantially simultaneously generated (e.g., within technical tolerances) in accordance with a receding horizon technique, wherein one of the multiple trajectories is selected for the vehicle 302 to navigate.

In at least one example, the planning component 324 may determine a location of a user based on image data of an environment received from the user using, for example, bags of binary words with image-based features, artificial neural network, and the like. Further, the planning component 324 may determine a pickup location associated with a location. A pickup location may be a specific location (e.g., a parking space, a loading zone, a portion of a ground surface, etc.) within a threshold distance of a location (e.g., an address or location associated with a dispatch request) where the vehicle 302 may stop to pick up a passenger. In at least one example, the planning component 324 may determine a pickup location based at least in part on determining a user identity (e.g., determined via image recognition or received as an indication from a user device, as discussed herein).

In at least one example, the vehicle computing device 304 may include one or more system controllers 326, which may be configured to control steering, propulsion, braking, safety, emitters, communication, and other systems of the vehicle 302. These system controller(s) 326 may communicate with and/or control corresponding systems of the drive module(s) 314 and/or other components of the vehicle 302.

The memory 318 may further include one or more map(s) 328 that may be used by the vehicle 302 to navigate within the environment. For the purpose of this application, a map may be any number of data structures modeled in two dimensions, three dimensions, or N dimensions that are capable of providing information about an environment, such as, but not limited to, topologies (such as intersections), streets, mountain ranges, roads, terrain, and the environment in general. In some examples, a map may include, but is not limited to: texture information (e.g., color information (e.g., RGB color information, Lab color information, HSV/HSL color information), and the like), intensity information (e.g., LIDAR information, RADAR information, and the like); spatial information (e.g., image data projected onto a mesh, individual "surfels" (e.g., polygons associated with individual color and/or intensity)), reflectivity information (e.g., specularity information, retroreflectivity information, BRDF information, BSSRDF information, and the like). In one example, a map may include a three-dimensional mesh of the environment. In some examples, the map may be stored in a tiled format, such that individual tiles of the map represent a discrete portion of an environment and may be loaded into working memory as needed. In at least one example, the one or more maps 328 may include at least one map (e.g., images and/or a mesh). In some examples, the vehicle 302 may be controlled based at least in part on the maps 328. That is, the maps 328 may be used in connection with the localization component 320, the perception component 322, and/or the planning component 324 to determine a location of the vehicle 302, identify objects in an environment, and/or generate routes and/or trajectories to navigate within an environment.

In some examples, the one or more map(s) 328 may be stored on a remote computing device(s) (such as computing device(s) 330) accessible via one or more network(s) 332. In some examples, multiple maps 328 may be stored based on, for example, a characteristic (e.g., type of entity, time of day, day of week, season of the year, etc.). Storing multiple maps 328 may have similar memory requirements but increase the speed at which data in a map may be accessed.

As shown in FIG. 3, in some examples, the occupant protection system 120 may be stored in the memory 318 of the computing device 304 of the vehicle 302 or remote from the vehicle 302 in the memory 334 of the computing device(s) 330. In some examples, some portions of the occupant protection system 120 may be stored in the memory 318 of the computing device 304 of the vehicle 302, and other portions of the occupant protection system 120 may be stored remotely in the memory 334 of the computing device(s) 330, and the separately located portions of the occupant protection system 120 may operate together in a coordinated manner.

In some examples, aspects of some or all of the components discussed herein may include any models, algorithms, and/or machine learning algorithms. For example, in some examples, the components in the memory 318 and/or the memory 334 may be implemented as a neural network.

As described herein, an exemplary neural network is a biologically inspired algorithm which passes input data through a series of connected layers to produce an output. Each layer in a neural network may also include another neural network or may include any number of layers (whether convolutional or not). As may be understood in the context of this disclosure, a neural network may utilize machine learning, which may refer to a broad class of such algorithms in which an output is generated based on learned parameters.

Although discussed in the context of neural networks, any type of machine learning may be used consistent with this disclosure. For example, machine learning algorithms may include, but are not limited to, regression algorithms (e.g., ordinary least squares regression (OLSR), linear regression, logistic regression, stepwise regression, multivariate adaptive regression splines (MARS), locally estimated scatterplot smoothing (LOESS)), instance-based algorithms (e.g., ridge regression, least absolute shrinkage and selection operator (LASSO), elastic net, least-angle regression (LARS)), decisions tree algorithms (e.g., classification and regression tree (CART), iterative dichotomiser 3 (ID3), Chi-squared automatic interaction detection (CHAID), decision stump, conditional decision trees), Bayesian algorithms (e.g., naïve Bayes, Gaussian naive Bayes, multinomial naïve Bayes, average one-dependence estimators (AODE), Bayesian belief network (BNN), Bayesian networks), clustering algorithms (e.g., k-means, k-medians, expectation maximization (EM), hierarchical clustering), association rule learning algorithms (e.g., perceptron, back-propagation, hopfield network, Radial Basis Function Network (RBFN)), deep learning algorithms (e.g., Deep Boltzmann Machine (DBM), Deep Belief Networks (DBN), Convolutional Neural Network (CNN), Stacked Auto-Encoders), Dimensionality Reduction Algorithms (e.g., Principal Component Analysis (PCA), Principal Component Regression (PCR), Partial Least Squares Regression (PLSR), Sammon Mapping, Multidimensional Scaling (MDS), Projection Pursuit, Linear Discriminant Analysis (LDA), Mixture Discriminant Analysis (MDA), Quadratic Discriminant Analysis (QDA), Flexible Discriminant Analysis (FDA)), Ensemble Algorithms (e.g., Boosting, Bootstrapped Aggregation (Bagging), AdaBoost, Stacked Generalization (blending), Gradient Boosting Machines (GBM), Gradient Boosted Regression Trees (GBRT), Random Forest), SVM (support vector machine), supervised learning, unsupervised learning, semi-supervised learning, etc.

Additional examples of architectures include neural networks, such as, for example, ResNet70, ResNet101, VGG, DenseNet, PointNet, and the like.

In at least one example, the sensor system(s) 306 may include LIDAR sensors, radar sensors, ultrasonic transducers, sonar sensors, location sensors (e.g., GPS, compass, etc.), inertial sensors (e.g., inertial measurement units (IMUs), accelerometers, magnetometers, gyroscopes, etc.), cameras (e.g., RGB, IR, intensity, depth, time-of-flight (TOF), etc.), microphones, wheel encoders, environment sensors (e.g., temperature sensors, humidity sensors, light sensors, pressure sensors, etc.), etc. The sensor system(s) 306 may include multiple examples of each of these or other types of sensors. For example, the LIDAR sensors may include individual LIDAR sensors located at the corners, front, back, sides, and/or top of the vehicle 302. As another example, the camera sensors may include multiple cameras disposed at various locations about the exterior and/or interior of the vehicle 302. The sensor system(s) 306 may provide input to the vehicle computing device 304. Additionally, or alternatively, the sensor system(s) 306 may send sensor data, via the one or more networks 332, to the one or more computing device(s) 330 at a particular frequency, after a lapse of a predetermined period of time, in near real-time, etc.

The vehicle 302 may also include one or more emitters 308 for emitting light and/or sound, as described above. The emitters 308 in this example include interior audio and visual emitters to communicate with passengers of the vehicle 302. By way of example and not limitation, interior emitters may include speakers, lights, signs, display screens, touch screens, haptic emitters (e.g., vibration and/or force feedback), mechanical actuators (e.g., seatbelt tensioners, seat positioners, headrest positioners, etc.), and the like. The emitters 308 in this example also include exterior emitters. By way of example and not limitation, the exterior emitters in this example include lights to signal a direction of travel or other indicator of vehicle action (e.g., indicator lights, signs, light arrays, etc.), and one or more audio emitters (e.g., speakers, speaker arrays, horns, etc.) to audibly communicate with pedestrians or other nearby vehicles, one or more of which including acoustic beam steering technology.

The vehicle 302 may also include one or more communication connection(s) 310 that enable communication between the vehicle 302 and one or more other local or remote computing device(s). For example, the communication connection(s) 310 may facilitate communication with other local computing device(s) on the vehicle 302 and/or the drive module(s) 314. Also, the communication connection(s) 310 may allow the vehicle 302 to communicate with other nearby computing device(s) (e.g., other nearby vehicles, traffic signals, etc.). The communications connection(s) 310 also enable the vehicle 302 to communicate with a remote teleoperations computing device or other remote services.

The here communications connection(s) 310 may include physical and/or logical interfaces for connecting the vehicle computing device 304 to another computing device or a network, such as network(s) 332. For example, the communications connection(s) 310 may enable Wi-Fi-based communication, such as via frequencies defined by the IEEE 802.11 standards, short range wireless frequencies such as Bluetooth®, cellular communication (e.g., 2G, 3G, 4G, 4G LTE, 5G, etc.) or any suitable wired or wireless communications protocol that enables the respective computing device to interface with the other computing device(s).

In at least one example, the vehicle 302 may include one or more drive modules 314. In some examples, the vehicle 302 may have a single drive module 314. In at least one example, if the vehicle 302 has multiple drive modules 314, individual drive modules 314 may be positioned on opposite ends of the vehicle 302 (e.g., the leading end and the rear, etc.). In at least one example, the drive module(s) 314 may include one or more sensor systems to detect conditions of the drive module(s) 314 and/or the surroundings of the vehicle 302. By way of example and not limitation, the sensor system(s) 306 may include one or more wheel encoders (e.g., rotary encoders) to sense rotation of the wheels (e.g., wheels 110 in FIG. 1) of the drive modules, inertial sensors (e.g., inertial measurement units, accelerometers, gyroscopes, magnetometers, etc.) to measure orientation and acceleration of the drive module, cameras or other image sensors, ultrasonic sensors to acoustically detect objects in the surroundings of the drive module, LIDAR sensors, radar sensors, etc. Some sensors, such as the wheel encoders may be unique to the drive module(s) 314. In some cases, the sensor system(s) on the drive module(s) 314 may overlap or supplement corresponding systems of the vehicle 302 (e.g., sensor system(s) 306).

The stopped here drive module(s) 314 may include many of the vehicle systems, including a high voltage battery, a motor to propel the vehicle, an inverter to convert direct current from the battery into alternating current for use by other vehicle systems, a steering system including a steering motor and steering rack (which may be electric), a braking system including hydraulic or electric actuators, a suspension system including hydraulic and/or pneumatic components, a stability control system for distributing brake forces to mitigate loss of traction and maintain control, an HVAC system, lighting (e.g., lighting such as head/tail lights to illuminate an exterior surrounding of the vehicle), and one or more other systems (e.g., cooling system, safety systems, onboard charging system, other electrical components such as a DC/DC converter, a high voltage junction, a high voltage cable, charging system, charge port, etc.). Additionally, the drive module(s) 314 may include a drive module controller, which may receive and preprocess data from the sensor system(s) 306 and to control operation of the various vehicle systems. In some examples, the drive module controller may include one or more processors and memory communicatively coupled with the one or more processors. The memory may store one or more modules to perform various functionalities of the drive module(s) 314. Furthermore, the drive module(s) 314 also include one or more communication connection(s) that enable communication by the respective drive module with one or more other local or remote computing device(s).

In at least one example, the direct connection 312 may provide a physical interface to couple the one or more drive module(s) 314 with the body of the vehicle 302. For example, the direct connection 312 may allow the transfer of energy, fluids, air, data, etc. between the drive module(s) 314 and the vehicle 302. In some examples, the direct connection 312 may further releasably secure the drive module(s) 314 to the body of the vehicle 302.

In at least one example, the localization component 320, perception component 322, the planning component 324, and/or the occupant protection system 120 may process sensor data, as described above, and may send their respective outputs, over the one or more network(s) 332, to one or more computing device(s) 330. In at least one example, the localization component 320, the perception component 322, the planning component 324, and/or the occupant protection system 120 may send their respective outputs to the one or more computing device(s) 330 at a particular frequency, after a lapse of a predetermined period of time, in near real-time, etc.

The processor(s) 316 of the vehicle 302 and/or the processor(s) 336 of the computing device(s) 330 may include any suitable processor capable of executing instructions to process data and perform operations as described herein. By way of example and not limitation, the processor(s) 316 and 336 may include one or more Central Processing Units (CPUs), Graphics Processing Units (GPUs), or any other device or portion of a device that processes electronic data to transform that electronic data into other electronic data that may be stored in registers and/or memory. In some examples, integrated circuits (e.g., ASICs, etc.), gate arrays (e.g., FPGAs, etc.), and other hardware devices may also be considered processors in so far as they are configured to implement encoded instructions.

Memory 318 and 334 are examples of non-transitory computer-readable media. The memory 318 and 334 may store an operating system and one or more software applications, instructions, programs, and/or data to implement the methods described herein and the functions attributed to the various systems. In various implementations, the memory may be implemented using any suitable memory technology, such as static random access memory (SRAM), synchronous dynamic RAM (SDRAM), nonvolatile/Flash-type memory, or any other type of memory capable of storing information. The architectures, systems, and individual elements described herein may include many other logical, programmatic, and physical components, of which those shown in the accompanying figures are merely examples that are related to the discussion herein.

In some examples, for example as shown in FIG. 3, the occupant protection system 120 may include the seat actuator system 212, including the actuator controller 214 configured to control the seat actuator 216, and/or a seatbelt system 140. As shown in FIG. 3, the seat actuator system 212 and the seatbelt system 140 may be associated with one or more of the vehicle computing device 304 on board the vehicle 302 or the remote computing device(s) 330.

It should be noted that while FIG. 3 is illustrated as a distributed system, in alternative examples, components of the vehicle 302 may be associated with the computing device(s) 330, and/or components of the computing device(s) 330 may be associated with the vehicle 302. That is, the vehicle 302 may perform one or more of the functions associated with the computing device(s) 330 and vice versa.

In various implementations, the parameter values and other data illustrated herein may be included in one or more data stores, and may be combined with other information not described or may be partitioned differently into more, fewer, or different data structures. In some implementations, data stores may be physically located in one memory or may be distributed among two or more memories.

Those skilled in the art will appreciate that the example architecture 300 shown in FIG. 3 is merely illustrative and are not intended to limit the scope of the present disclosure. In particular, the computing system and devices may include any combination of hardware or software that can perform the indicated functions, including computers, network devices, internet appliances, tablet computers, PDAs, wireless phones, pagers, etc. The architecture 300 may also be connected to other devices that are not illustrated, or instead may operate as a stand-alone system. In addition, the functionality provided by the illustrated components may in some implementations be combined in fewer components or distributed in additional components. Similarly, in some implementations, the functionality of some of the illustrated components may not be provided and/or other additional functionality may be available.

Those skilled in the art will also appreciate that, while various items are illustrated as being stored in memory or storage while being used, these items or portions of them may be transferred between memory and other storage devices for purposes of memory management and data integrity. Alternatively, in other implementations, some or all of the software components may execute in memory on another device and communicate with the illustrated architecture 300. Some or all of the system components or data structures may also be stored (e.g., as instructions or structured data) on a non-transitory, computer-accessible medium or a portable article to be read by an appropriate drive, various examples of which are described above. In some implementations, instructions stored on a computer-accessible medium separate from the architecture 300 may be transmitted to the architecture 300 via transmission media or signals such as electrical, electromagnetic, or digital signals, conveyed via a communication medium such as a wireless link. Various implementations may further include receiving, sending, or storing instructions and/or data implemented in accordance with the foregoing description on a computer-accessible medium. Accordingly, the techniques described herein may be practiced with other control system configurations. Additional information about the operations of the modules of the vehicle 102 is discussed below.

Figure 4:
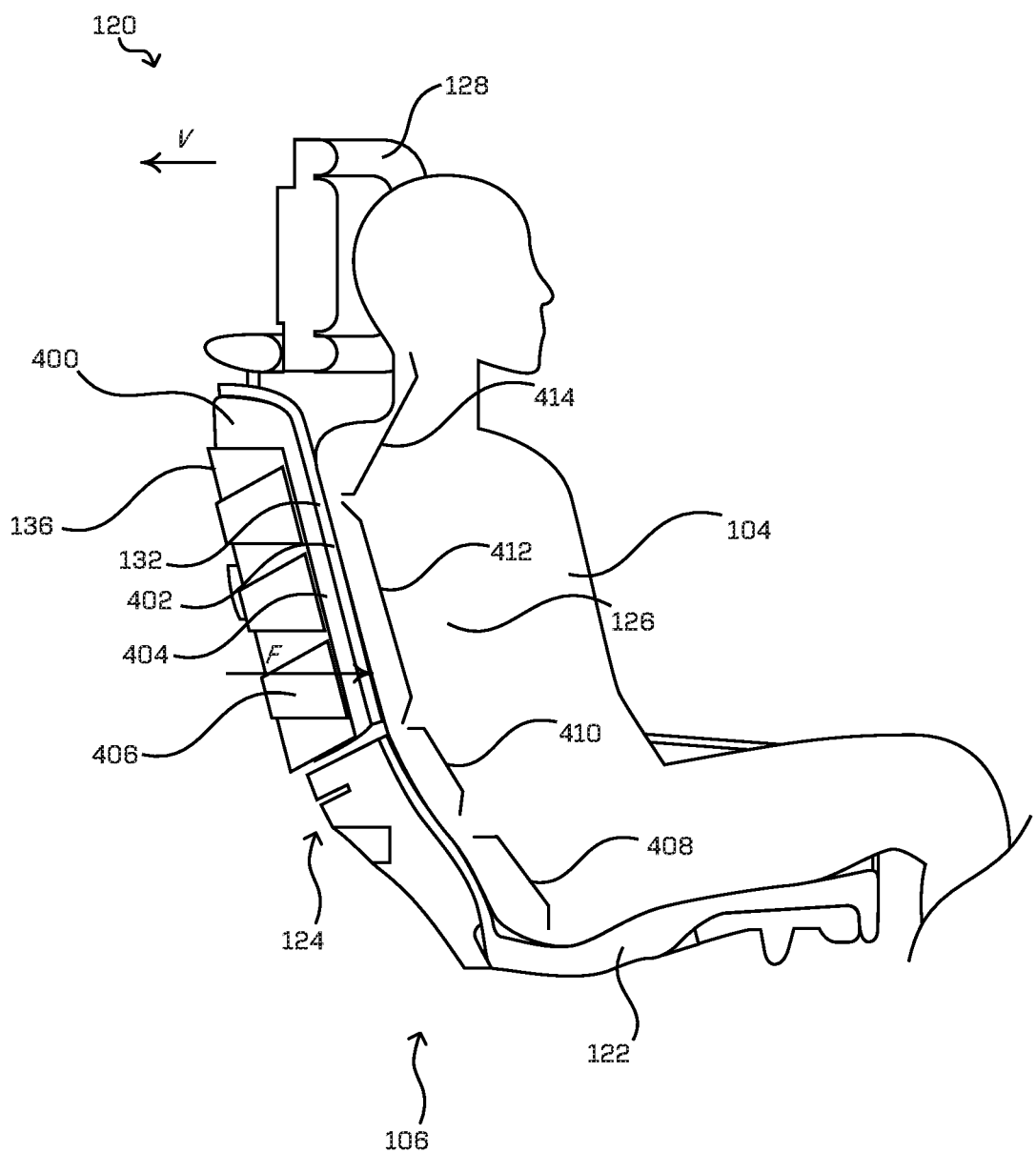
FIG. 4 is a schematic side view of an occupant in an example seat including example crushable elements during a collision in which the occupant is facing a direction opposite the direction of travel of the vehicle.

FIG. 4 is a schematic side view of an occupant 104 in an example seat 106 of an example occupant protection system 120. In some examples, for example as shown in FIG. 4, the seat 106 may include a seat base 122 and a seatback 124 associated with the seat base 122 and configured to provide support to at least a portion of the back 126 of the occupant 104. The example seatback 124 shown in FIG. 4 includes a front surface 132, a back surface 136 opposite the front surface 132, and an intermediate portion 400 between the front surface 132 and the back surface 136. In the example shown in FIG. 4, the intermediate portion 400 includes a first portion 402 including a first material having a first stiffness and a second portion 404 including a second material different than the first material, such that the stiffness characteristic of the seatback 124 is relatively greater than the first stiffness of the first material. For example, the first material may include a first foam material (e.g., a high-stiffness and/or high-density polyurethane foam or one or more materials having similar characteristics (e.g., having similar stiffness characteristics)), and the second material may include a second foam material (e.g., polypropylene foam or a material having similar characteristics (e.g., having similar stiffness characteristics)) having a stiffness greater than the first stiffness of the first foam material. For example, the first portion 402 may include a layer of the first material at least partially covering the second portion 404, which may include a layer of the second material. In some examples, the layers may have different thickness, and in some examples, the layers may have substantially the same thickness. In some examples, one of more of the layers may have a thickness that varies, for example, a thickness that corresponds to anatomical features of the occupant 104, for example, to enhance comfort and/or protection provided by the first portion 402 and/or the second portion 404. The first portion 402 may be configured to provide a relatively comfortable surface against which at least a portion of the back 126 of the occupant 104 may rest. The second portion 404 may be configured to provide a relatively stiffer support relative to the first portion 402, for example, to improve protection provided to the occupant 104 by the seatback 124. In some examples, the thicknesses, materials, and/or shapes of the first and/or second portions 402 and/or 404 may be selected and/or configured based at least in a part on, for example, forces anticipated during a collision or deceleration event and/or on the overall thickness of the seatback 124 and its anticipated compression distance.

As shown in FIG. 4, the example seatback 124 may also include at least one crushable element 406, for example, between the second portion 404 and the back surface 136 of the seatback 124. In some examples, the at least one crushable element 406 may be configured to compress in an at least partially non-resilient manner (e.g., a fully non-resilient manner) and reduce reaction forces applied against at least a portion of the back 126 of the occupant 104. For example, the at least one crushable element 406 may be configured to compress as the second material of the second portion 404 compresses and the stiffness of the second material increases to a threshold stiffness. For example, at least some seatbacks 124 consistent with the example seatback 124 shown in FIG. 4 may exhibit reaction forces F at least similar to the example reaction force F shown in FIG. 2B. For example, referring to FIG. 2B, the example seatback 124 shown in FIG. 4 may exhibit a reaction force F from the seatback 124 against at least a portion of the back 126 of the occupant 104 that increases from a minimal reaction force (e.g., a zero reaction force F) to a first reaction force F1 corresponding to a first displacement D1 of the front surface 132 of the seatback 124 as the first portion 402 and/or the second portion 404 compress(es). Thereafter, as the seatback 124 continues to compress and the front surface 132 displaces further, the reaction force F may remain substantially constant at F1 until, for example, the second displacement D2, after which the reaction force F decreases to F2. In some examples consistent with the example shown in FIG. 4, the stiffness of the second portion 404 may remain substantially constant as the displacement increases from the first displacement D1 to the second displacement D2. Thereafter, as the displacement increases further, the stiffness of the second portion 404 may increase, and the at least one crushable element 406 may be configured to begin crushing (e.g., at least partially collapsing) as the displacement of the front surface 132 reaches the second displacement D2, thereby reducing the reaction force to F2. In some examples consistent with the example seatback shown in FIG. 4, thereafter the reaction force F may continue to stay substantially reduced and/or constant as the at least one crushable element 406 continues to compress until the displacement reaches the third displacement D3. As shown in FIG. 2B, some such examples may result in a relatively constant reaction force F being transmitted to at least a portion of the back 126 of the occupant 104 during the compression event (e.g., during a collision and/or a rapid deceleration of the vehicle 102). In some examples, the reaction force F may gradually increase relative to the second reaction force F2 as displacement of the front surface 132 of the seatback 124 further displaces from the second displacement D2 to the third displacement D3. This may result in the seatback 124 consistent with the example shown in FIG. 4 reducing the likelihood and/or or the severity of injury to the occupant 104 during a collision and/or rapid deceleration of the vehicle 102.

One or more of the at least one crushable element 406 may include one or more layers of material, one or more plates of material, one or more cones of material, and/or one or more tubes of material (e.g., tubes having a circular cross-section or a rectangular cross-section). In some examples including one or more layers of material, the one or more layers may have different thicknesses, and/or the layers may have a thickness that varies across the area of the layer. For example, the layers may include one or more layers formed in a honeycomb-like form and/or an eggcrate-like form. In some examples, the one or more crushable elements 406 may include plastics, foams (e.g., polypropylene foam), aluminum alloys, corrugated aluminum wire, etc.

In some examples, the shape, thickness, construction, stiffness, and/or material(s) of the at least one crushable element 406 may be varied across the area of the seatback 124, for example, to tune the stiffness of the seatback 124 according to different parts of the back 126 of the occupant 104. For example, as shown in FIG. 4, the back 126 of the occupant 104 includes a pelvic region 408, a lumbar region 410, a thoracic region 412, and a cervical region 414. The example seatback 124 consistent with the example shown in FIG. 4 may have a stiffness that varies with different regions substantially corresponding to the different regions of the back 126 of the occupant 104. In some examples, the at least one crushable element 406 may include a first crushable element and a second crushable element, and the shape, the thickness, the construction, the stiffness, and/or the materials of the first crushable element and the second crushable element may differ from one another. In some examples, the at least one crushable element 406 may include a first crushable zone having a first crush stiffness and a second crushable zone having a second crush stiffness greater than the first crush stiffness. In some such examples, the first crushable zone may be closer to the seat base 122 than the second crushable zone, for example, to provide a relatively stiffer support for the pelvic region 408 than the lumbar region 410, the thoracic region 412, and/or the cervical region 414.

Figure 5B:
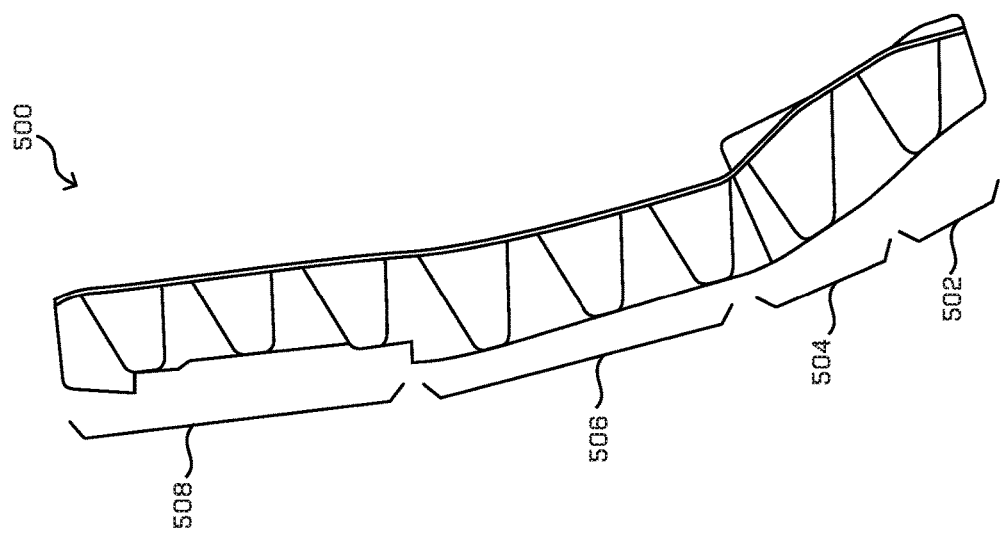
FIG. 5B is a schematic side view of the example crushable elements shown in FIG. 5A.
Figure 5A:
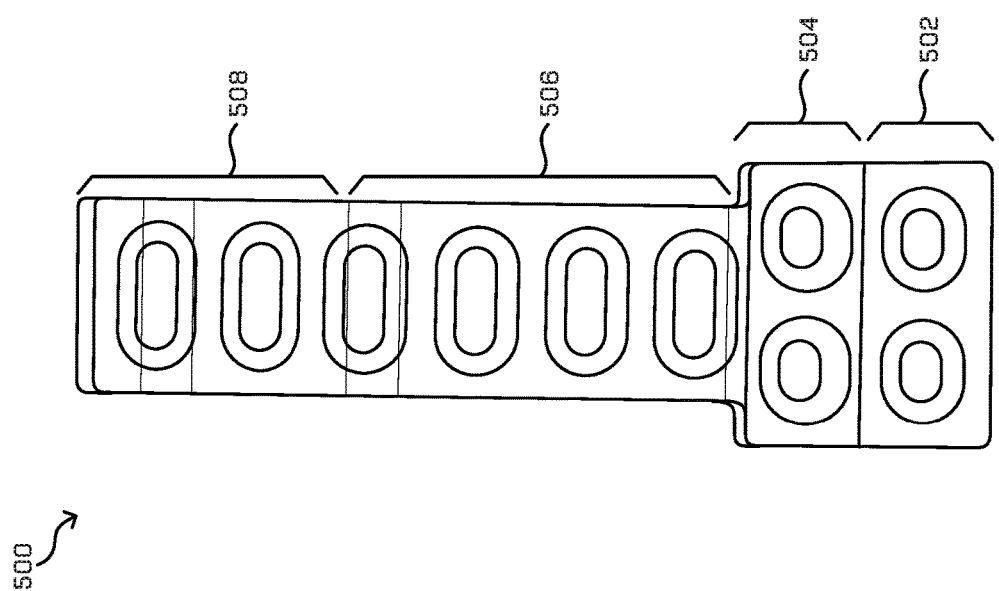
FIG. 5A is a schematic front view of example crushable elements for a seatback.

For example, FIGS. 5A and 5B show respective front and side views of example crushable elements 500 tuned to provide different levels of stiffness substantially corresponding to different regions of the back 126 of an occupant 104, for example, to provide correspondingly different levels of reaction forces for the different regions. In some examples, the crushable elements 500 may substantially correspond to the crushable elements 406 shown in FIGS. 4, 6, and 7. In some examples, the crushable elements 500 may include one or more pelvic elements 502, one or more lumbar elements 504, one or more thoracic elements 506, and/or one or more cervical elements 508 configured to substantially correspond to the pelvic region 408, the lumbar region 410, the thoracic region 412, and/or the cervical region 414, respectively, of the back 126 of the occupant 104. In some examples, the one or more pelvic elements 502 may be relatively stiffer than the one or more lumbar elements 504, which may be relatively stiffer than the one or more thoracic elements 506, which may be relatively stiffer than the one or more cervical elements 508. Other relative stiffness combinations are contemplated. In some examples, the one or more pelvic elements 502, the one or more lumbar elements 504, the one or more thoracic elements 506, and/or the one or more cervical elements 508 may exhibit respective reaction force profiles having a shape at least similar to the reaction force profile shape shown in FIG. 2B, except that the magnitude of force of the respective reaction force profiles may differ, for example, such that in general, the one or more pelvic elements 502 may exhibit a relatively greater reaction force than the one or more lumbar elements 504, which may exhibit a relatively greater reaction force than the one or more thoracic elements 506, which may exhibit a relatively greater reaction force than the one or more cervical elements 508. Other relative reaction forces are contemplated. Although the examples shown in FIG. 5 include example crushable elements 500 having a substantially oval-shaped cross-section, other cross-sectional shapes are contemplated, such as, for example, rectangular-shaped, circular-shaped, square-shaped, etc.

Figure 6:
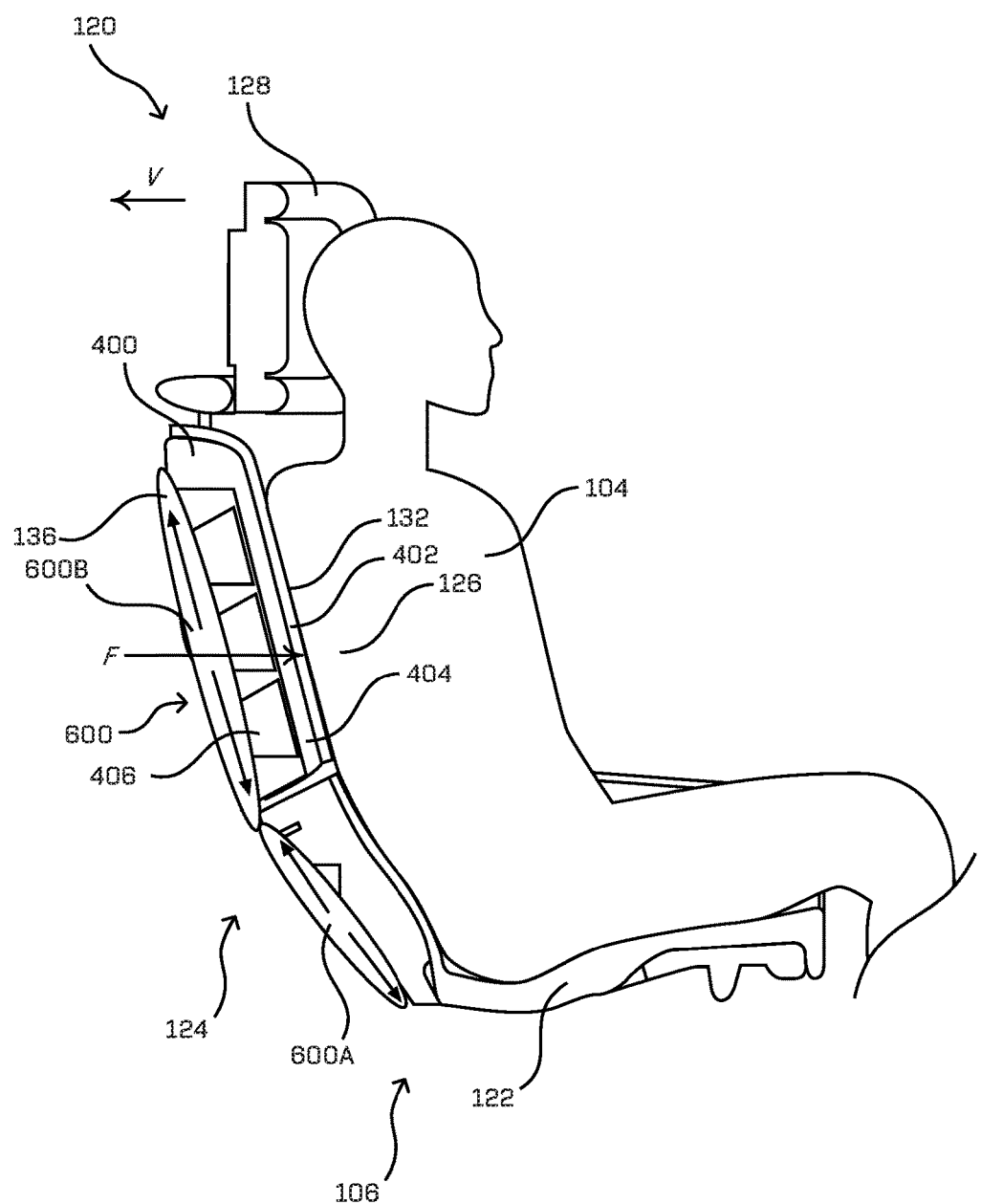
FIG. 6 is a schematic side view of an occupant in an example seat including example damping elements during a collision in which the occupant is facing a direction opposite the direction of travel of the vehicle.

As shown in FIG. 6, in some examples, the seatback 124 may include a damping layer 600 configured to at least partially equalize reaction forces communicated across an area corresponding to at least a portion of the back 126 of the occupant 104. For example, the seat 106 and the seatback 124 shown in FIG. 6 may have a construction at least substantially similar to the example seat 106 and example seatback 124 shown in FIG. 4, except with the addition of the damping layer 600. In some examples, the damping layer 600 may be configured to reduce peak forces and/or reduce relatively sharp peaks in the reaction force that may be transmitted to portions of the back 126 of the occupant 104, for example, which may result from the anatomy of the occupant 104 (e.g., shoulder blades, the spine, etc.) and/or from one or more of the crushable elements 500 (e.g., due to the shape, thickness, construction, and/or materials of the crushable elements 500).

As shown in FIG. 6, the example seatback 124 includes the damping layer 600 between the crushable elements 500 and the back surface 136 of the seatback 124. In some examples, the damping layer 600 may be between the crushable elements 500 and the front surface 132 of the seatback 124. In some examples, the damping layer 600 may include a single piece of the damping layer, and in some examples, the damping layer 600 may include more than a single piece, for example, as shown in FIG. 6, which includes a first portion 600A of the damping layer 600 configured to correspond to the location of an upper portion of the back 126 of the occupant 104 (e.g., the thoracic region 412 and/or the cervical region 414 shown in FIG. 4), and a second portion 600B of the damping layer 600 configured to correspond to a lower portion of the back 126 of the occupant 104 (e.g., the pelvic region 408 and/or the lumbar region 410 shown in FIG. 4). In some examples, the damping layer 600 may include one or more gel-like materials, such as, for example, stimuli-responsive gels (e.g., hydrogels). In some examples, the gel-like material may be complimented by, or replaced with, other materials that change at least one material characteristic upon receipt of an electrical charge, such as, for example, electroactive polymers that may change size and/or shape when stimulated by an electric field, including, for example, dielectric electroactive polymers, ferroelectric polymers (e.g., polyvinylidene fluoride (PVDF)), electrostrictive graft polymers, liquid crystalline polymers, ionic electroactive polymers, electrorheological fluid, ionic polymer-metal composites (e.g., Nafion and/or Flemion), etc. In some examples, the gel-like materials may include a gel encapsulated in a membrane configured to contain the gel. At least some seatbacks 124 consistent with the example seatback 124 shown in FIG. 6 may exhibit reaction forces F at least similar to the example reaction force F profile shown in FIG. 2B. In some such examples, one or more of the crushable elements 500 and/or the anatomy of the occupant 104 may result in relatively localized reaction force peaks, and the damping layer 600, in some examples, may result in reducing the reaction force peaks by distributing the reaction force peaks outward from the localized regions. This may further reduce the likelihood of injury to the occupant 104 during a collision and/or rapid deceleration of the vehicle 102.

Figure 7:
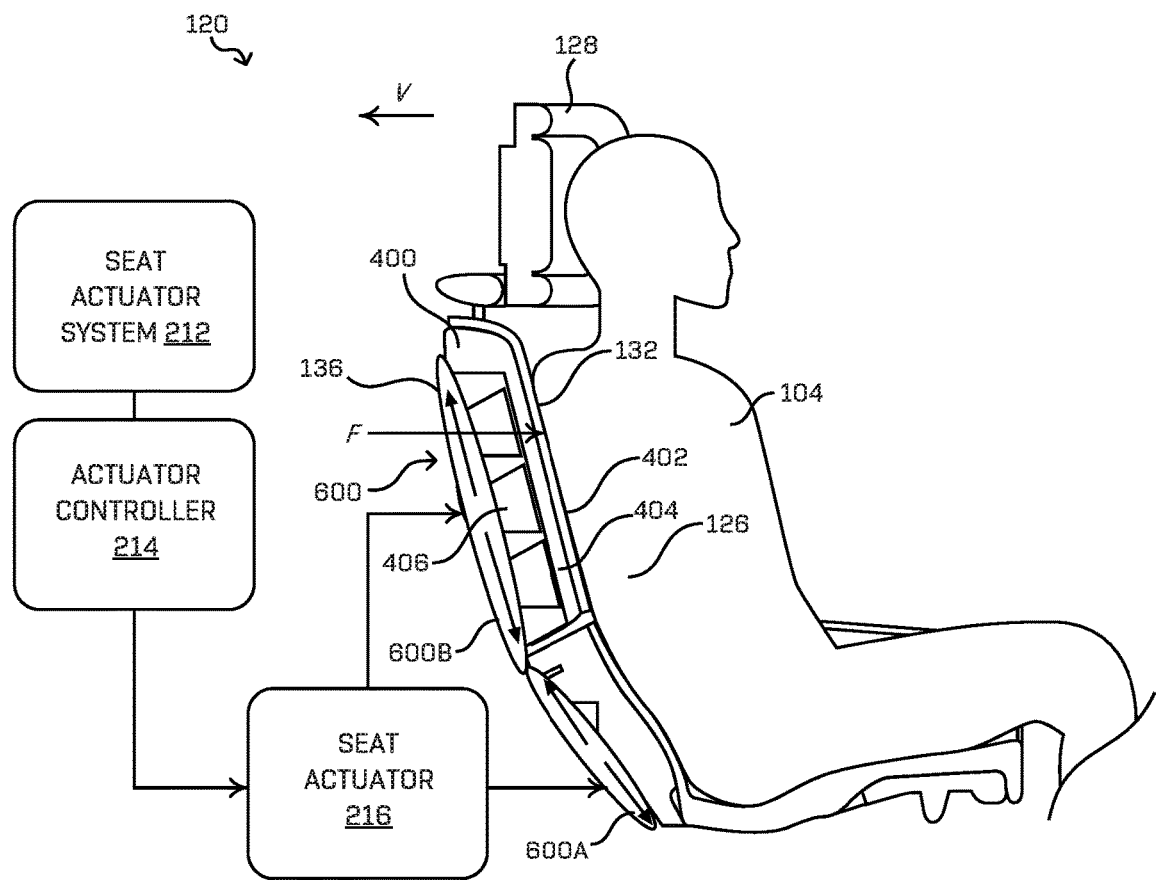
FIG. 7 is a schematic side view of an occupant in an example seat including example damping elements and an example seat actuator system during a collision in which the occupant is facing a direction opposite the direction of travel of the vehicle.

As shown in FIG. 7, some examples of the occupant protection system 120 may include a damping layer 600 in addition to a seat actuator system 212 and/or an actuator controller 214 configured to control operation of a seat actuator 216 associated with the seat 106. For example, the seat 106 and the seatback 124 shown in FIG. 7 may have a construction at least substantially similar to the example seat 106 and example seatback 124 shown in FIG. 6. Some examples of the damping layer 600 may include a gel-like material configured change at least one material characteristic upon receipt of an electrical charge. In some such examples, the seat actuator 216 may include a source of electrical energy and may be configured to communicate the electrical charge to the damping layer 600 in order change one or more material characteristics associated with the gel-like material of the damping layer 600. For example, the seat actuator system 212 may be configured to trigger communication of the electrical charge immediately prior to a collision or rapid deceleration of the vehicle 102, for example, to activate the damping layer 600 to harden it relative to its un-activated state, so that the initial reaction force F is relatively greater, and thereafter, cease communication of the electrical charge to the damping layer 600, so that the damping layer 600 softens (relative to the activated and hardened damping layer 600). In some examples, this may result in a relatively more rapid coupling of the occupant 104 to the seatback 124, and thereafter, a more constant reaction force F being transmitted to at least a portion of the back 126 of the occupant 104 during compression of the seatback 124. At least some seatbacks 124 consistent with the example seatback 124 shown in FIG. 7 may exhibit reaction forces F at least similar to the example reaction force F profile shown in FIG. 2B. Such a reaction force profile, in at least some examples, may further reduce the likelihood of injury to the occupant 104 during a collision and/or rapid deceleration of the vehicle 102.

Figure 8:
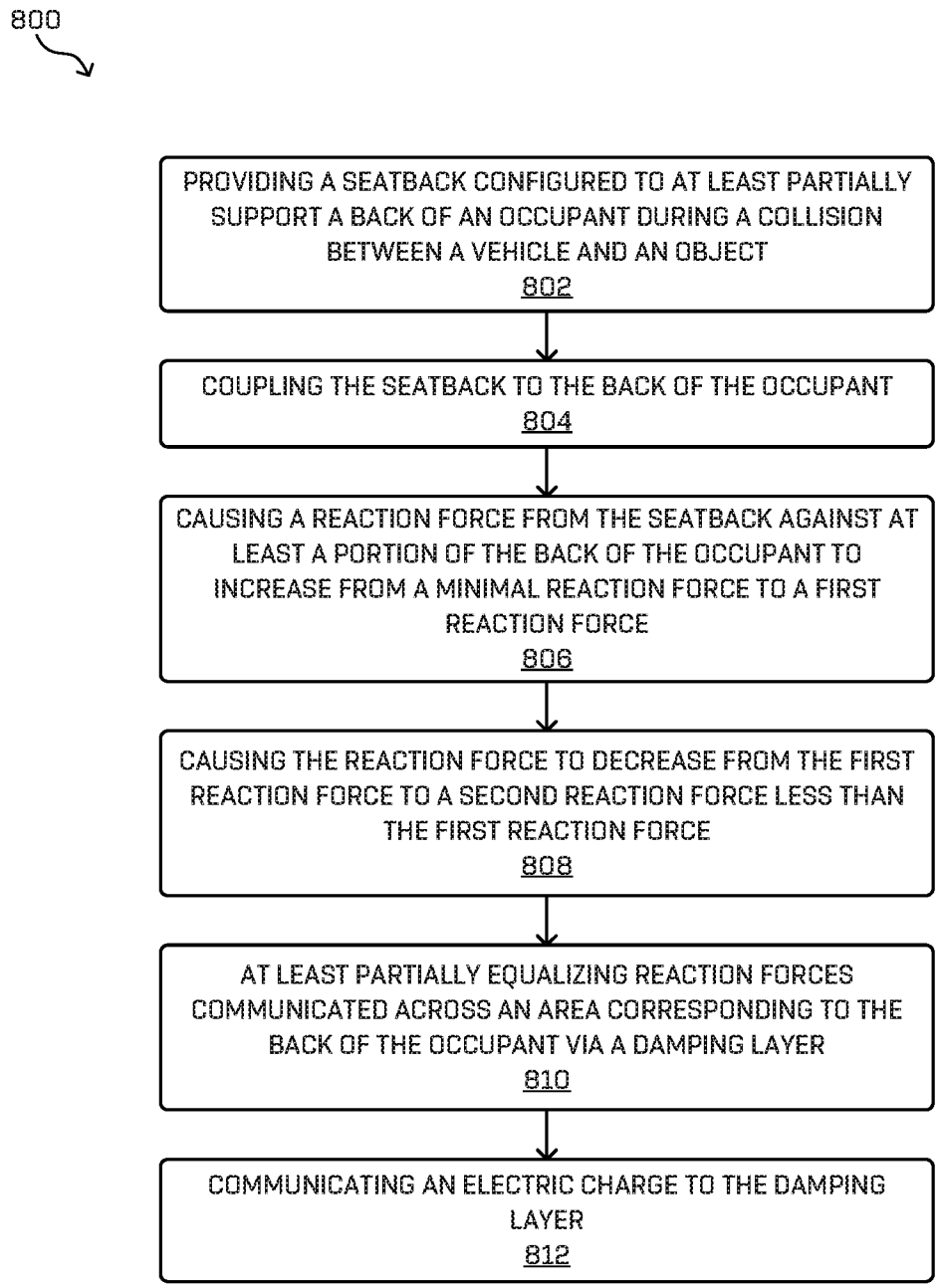
FIG. 8 is a flow diagram of an example process for protecting an occupant of a vehicle.

FIG. 8 is a flow diagram of an example process illustrated as a collection of blocks in a logical flow graph, which represent a sequence of operations that can be implemented in hardware, software, or a combination thereof. In the context of software, the blocks represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order and/or in parallel to implement the processes.

FIG. 8 is a flow diagram of an example process 800 for protecting an occupant of a vehicle. At 802, the example process 800 may include providing a seatback configured to at least partially support a back of the occupant during a collision between the vehicle and an object. In some examples, the seatback may include a first portion including a first material having a first stiffness and a second portion including a second material different than the first material. In some examples, the first portion may include a first foam material having a first stiffness, and the second portion may include a membrane at least partially enclosing a third portion including a third material within the membrane. In some examples, the third material may include a second foam material having a third stiffness greater than the first stiffness of the first foam material, for example, as described previously herein.

At 804, the example process 800 may include coupling the seatback to the back of the occupant. For example, the seatback may be coupled to at least a portion of the back of the occupant, such that the seatback at least partially supports the back of the occupant during application of a force in a direction toward the back of the occupant. In some examples, coupling the seatback to the back of the occupant may be passive, for example, such that motion of the back of the occupant toward the seatback acts to couple the back of the occupant to the seatback. In some examples, coupling the seatback to the back of the occupant may be at least partially active, for example, a portion of the seatback may be moved toward the back of the occupant and/or the seatback may be actively stiffened to increase the rate at which coupling of the seatback to the back of the occupant occurs, for example, as described herein. For example, this may include increasing pressure in an interior of the membrane, and increasing pressure in the interior of the membrane may include receiving a triggering signal indicative of at least one of an actual change in velocity of the vehicle or a predicted change in velocity of the vehicle, and causing, based at least in part on the triggering signal, a seatback actuator to increase the pressure in the interior of the membrane, for example, as described herein.

In some examples, at 806, the example process 800 may include causing a reaction force from the seatback against at least a portion of the back of the occupant to increase from a minimal reaction force to a first reaction force. For example, example process 800 may include causing a reaction force from the seatback against at least a portion of the back of the occupant to increase from zero reaction force to a first reaction force corresponding to a first displacement of a front surface of the seatback. For example, the seatback may exhibit a reaction force F against the at least a portion of the back of the occupant that increases from a minimal reaction force (e.g., a zero reaction force F) to a first reaction force corresponding to a first displacement of the front surface of the seatback, for example, as described herein with respect to FIGS. 2A, 2B, 4, 6, and 7.

At 808, the example process 800 may further include causing the reaction force to decrease from the first reaction force to a second reaction force less than the first reaction force. For example, the reaction force may decrease to the second reaction force as displacement of the front surface of the seatback further displaces from the first displacement to a second displacement greater than the first displacement. In some examples, the reaction force may thereafter increase gradually or remain substantially constant as the front surface of the seatback continues to displace toward the back surface of the seatback. For example, the first portion, the second portion, the third portion, the at least one crushable element, and/or the damping layer may be configured to maintain a substantially constant force against the back of the occupant while the seatback compresses from the second displacement toward a third displacement, for example, as described herein. For example, the second material may include a membrane at least partially enclosing a third material and including at least one vent. In some such examples, maintaining a substantially constant force against the back of the occupant may include releasing pressure inside the membrane via the at least one vent as the seatback compresses. In some examples, maintaining a substantially constant force against the back of the occupant may include associating at least one crushable element with at least one of the first portion or the second portion of the seatback, for example, as described herein with respect to FIGS. 4, 6, and 7.

Some examples of the process 800 may also include, at 810, at least partially equalizing reaction forces communicated across an area corresponding to the back of the occupant via a damping layer including a gel-like material, for example, as described herein with respect to FIGS. 6 and 7. Some such examples of the process 800 may also include, at 812, communicating an electric charge to the damping layer (e.g., to the gel-like material), for example, as described herein with respect to FIG. 7. This may result in increasing the rate at which the seatback is coupled to at least a portion of the back of the occupant.

It should be appreciated that the subject matter presented herein may be implemented as a computer process, a computer-controlled apparatus, a computing system, or an article of manufacture, such as a computer-readable storage medium. While the subject matter described herein is presented in the general context of program modules that execute on one or more computing devices, those skilled in the art will recognize that other implementations may be performed in combination with other types of program modules. Generally, program modules include routines, programs, components, data structures, and other types of structures that perform particular tasks or implement particular abstract data types.

Those skilled in the art will also appreciate that aspects of the subject matter described herein may be practiced on or in conjunction with other computer system configurations beyond those described herein, including multiprocessor systems, microprocessor-based or programmable consumer electronics, minicomputers, mainframe computers, handheld computers, mobile telephone devices, tablet computing devices, special-purposed hardware devices, network appliances, and the like.

Based on the foregoing, it should be appreciated that technologies for deploying an occupant protection system have been presented herein. Moreover, although the subject matter presented herein has been described in language specific to computer structural features, methodological acts, and computer readable media, it is to be understood that the invention defined in the appended claims is not necessarily limited to the specific features, acts, or media described herein. Rather, the specific features, acts, and media are disclosed as example forms of implementing the subject matter recited in the claims.

The subject matter described above is provided by way of illustration only and should not be construed as limiting. Furthermore, the claimed subject matter is not limited to implementations that solve any or all disadvantages noted in any part of this disclosure. Various modifications and changes may be made to the subject matter described herein without following the examples and applications illustrated and described, and without departing from the spirit and scope of the present invention, which is set forth in the following claims.

Example Clauses

A. An example seat configured to be coupled to a vehicle, the seat comprising:

a seat base configured to support at least a portion of a weight of an occupant of the seat;

a seatback associated with the seat base and configured to provide support to a back of the occupant, the seatback comprising:

a front surface configured to face the back of the occupant;

and an intermediate portion associated with the front surface, the intermediate portion comprising:

a first portion comprising a first material, the first portion having a first stiffness;

a second portion comprising a second material different than the first material, such that a stiffness characteristic of the seatback is relatively greater than the first stiffness of the first portion,
wherein the intermediate portion is configured such that as at least a portion of the back of the occupant pushes against the front surface of the seatback and the seatback is at least partially compressed, a reaction force from the seatback against the at least a portion of the back of the occupant increases from a minimal reaction force to a first reaction force for a first displacement of the front surface of the seatback and thereafter the reaction force one of:
  decreases from the first reaction force to a second reaction force as displacement of the front surface of the seatback further displaces from the first displacement to a second displacement greater than the first displacement; or
  remains substantially constant as displacement of the front surface of the seatback further displaces from the first displacement to a third displacement greater than the first displacement.

B. The seat of example A, wherein the second portion comprises a membrane at least partially enclosing a third portion comprising a third material within the membrane, the third material having a third stiffness greater than the first stiffness.

C. The seat of example A or example B, wherein the first material comprises a first foam material, and the third material comprises a second foam material having the third stiffness.

D. The seat of any one of example A through example C, further comprising an expansion device in flow communication with an interior of the membrane and configured to increase pressure in the interior of the membrane.

E. The seat of any one of example A through example D, wherein the membrane defines at least one vent configured to release pressure inside the membrane during compression of the seatback, wherein the at least one vent is configured to affect the stiffness characteristic of the seatback during compression of the seatback.

F. The seat of any one of example A through example E, further comprising at least one crushable element configured to compress as at least a portion of the intermediate portion compresses and a stiffness of the at least a portion of the intermediate portion increases.

G. The seat of any one of example A through example F, wherein the at least one crushable element comprises a first crushable element and a second crushable element, and wherein at least one of a shape, a thickness, a construction, or a material of the first crushable element and the second crushable element differ from one another.

H. The seat of any one of example A through example G, wherein at least one of a shape, a thickness, a construction, or a material of the at least one crushable element are tuned to provide the stiffness characteristic of the seatback.

I. The seat of any one of example A through example H, wherein the at least one crushable element comprises a first crushable zone having a first crush stiffness and a second crushable zone having a second crush stiffness greater than the first crush stiffness.

J. The seat of any one of example A through example I, wherein the first crushable zone is closer to the seat base than the second crushable zone.

K. The seat of any one of example A through example J, wherein the seatback further comprises a damping layer configured to at least partially equalize reaction forces communicated across an area corresponding to at least a portion of the back of the occupant.

L. The seat of any one of example A through example K, wherein the damping layer comprises a gel contained in a membrane.

M. The seat of any one of example A through example L, wherein the damping layer is configured change at least one material characteristic upon application of an electrical charge.

N. An example occupant protection system for a vehicle, the occupant protection system comprising:
  a seat configured to be coupled to a vehicle, the seat comprising:
    a seat base configured to support at least a portion of a weight of an occupant of the seat; and
    a seatback associated with the seat base and configured to provide support to at least a portion of a back of the occupant; and an actuator controller in communication with the seat actuator and configured to:
    receive a velocity change signal indicative of one or more of an actual change in velocity of the vehicle or a predicted change in velocity of the vehicle; and
    cause, based at least in part on the velocity change signal, one of:
      increasing a pressure inside a portion of the seatback; or
      communicating an electric charge to a damping layer configured to at least partially equalize reaction forces communicated across an area corresponding to at least a portion of the back of the occupant.

O. The system of example N, further comprising a seat actuator configured to increase a rate of coupling of at least a portion of the seatback to at least a portion of the back of the occupant.

P. The system of example N or example O, wherein the seatback comprises at least one crushable element configured to compress in an at least partially non-resilient manner and reduce the reaction forces.

Q. An example method for protecting an occupant of a vehicle, the method comprising:
  providing a seatback comprising a first portion comprising a first material having a first stiffness and a second portion comprising a second material different than the first material, wherein the second portion comprises at least one of:
    a membrane at least partially enclosing a third material; or
    a damping layer configured change at least one material characteristic upon application of an electrical charge;
  receiving a triggering signal indicative of at least one of an actual change in velocity of the vehicle or a predicted change in velocity of the vehicle; and
  causing, based at least in part on the triggering signal, at least one of:
    an increase in pressure in an interior of the membrane; or
    communication of an electric charge to the damping layer.

R. The method of example Q, wherein causing an increase in the pressure inside the membrane causes a reaction force from the seatback against at least a portion of the back of the occupant to increase from a minimal reaction force to a first reaction force for a first displacement of a front surface of the seatback, and the method further comprises:
  releasing pressure inside the membrane to cause the reaction force to one of:
    decrease from the first reaction force to a second reaction force less than the first reaction force as displacement of the front surface of the seatback further displaces from the first displacement to a second displacement greater than the first displacement; or remain substantially constant as displacement of the front surface of the seatback further displaces from the first displacement to a third displacement greater than the first displacement.

S. The method of example Q or example R, wherein causing communication of the electric charge to the damping layer causes a reaction force from the seatback against at least a portion of the back of the occupant to increase from a minimal reaction force to a first reaction force for a first displacement of a front surface of the seatback, and the method further comprises discontinuing communication of the electric charge to the damping layer to cause the reaction force to one of:

decrease from the first reaction force to a second reaction force less than the first reaction force as displacement of the front surface of the seatback further displaces from the first displacement to a second displacement greater than the first displacement; or remain substantially constant as displacement of the front surface of the seatback further displaces from the first displacement to a third displacement greater than the first displacement.

T. The method of any one of example Q through example S, further comprising tuning the reaction force by providing the seatback with at least one crushable element having at least one of a shape, a thickness, a construction, or a material selected to provide a stiffness characteristic of the seatback.

What is claimed is:

1. A seat configured to be coupled to a vehicle, the seat comprising:
   a seat base configured to support at least a portion of a weight of an occupant of the seat;
   a seatback associated with the seat base and configured to provide support to a back of the occupant, the seatback comprising:
      a front surface configured to face the back of the occupant;
      and
      an intermediate portion associated with the front surface, the intermediate portion comprising:
         a first portion comprising a first material, the first portion having a first stiffness;
         a second portion comprising a second material different than the first material, such that a stiffness characteristic of the seatback is relatively greater than the first stiffness of the first portion,
      wherein the intermediate portion is configured such that as at least a portion of the back of the occupant pushes against the front surface of the seatback and the seatback is at least partially compressed, a reaction force from the seatback against the at least a portion of the back of the occupant increases from a minimal reaction force to a first reaction force for a first displacement of the front surface of the seatback and thereafter the reaction force one of:
         decreases from the first reaction force to a second reaction force as displacement of the front surface of the seatback further progresses from the first displacement to a second displacement greater than the first displacement; or
         remains substantially constant as displacement of the front surface of the seatback further displaces from the first displacement to a third displacement greater than the first displacement.

2. The seat of claim 1, wherein the second portion comprises a membrane at least partially enclosing a third portion comprising a third material within the membrane, the third material having a third stiffness greater than the first stiffness.

3. The seat of claim 2, wherein the first material comprises a first foam material, and the third material comprises a second foam material having the third stiffness.

4. The seat of claim 2, further comprising an expansion device in flow communication with an interior of the membrane and configured to increase pressure in the interior of the membrane.

5. The seat of claim 2, wherein the membrane defines at least one vent configured to release pressure inside the membrane during compression of the seatback, wherein the at least one vent is configured to affect the stiffness characteristic of the seatback during compression of the seatback.

6. The seat of claim 1, further comprising at least one crushable element configured to compress as at least a portion of the intermediate portion compresses and a stiffness of the at least a portion of the intermediate portion increases.

7. The seat of claim 6, wherein the at least one crushable element comprises a first crushable element and a second crushable element, and wherein at least one of a shape, a thickness, a construction, or a material of the first crushable element and the second crushable element differ from one another.

8. The seat of claim 6, wherein at least one of a shape, a thickness, a construction, or a material of the at least one crushable element are tuned to provide the stiffness characteristic of the seatback.

9. The seat of claim 6, wherein the at least one crushable element comprises a first crushable zone having a first crush stiffness and a second crushable zone having a second crush stiffness greater than the first crush stiffness.

10. The seat of claim 9, wherein the first crushable zone is closer to the seat base than the second crushable zone.

11. The seat of claim 1, wherein the seatback further comprises a damping layer configured to at least partially equalize reaction forces communicated across an area corresponding to at least a portion of the back of the occupant.

12. The seat of claim 11, wherein the damping layer comprises a gel contained in a membrane.

13. The seat of claim 11, wherein the damping layer is configured change at least one material characteristic upon application of an electrical charge.

14. An occupant protection system for a vehicle, the occupant protection system comprising:
   a seat configured to be coupled to a vehicle, the seat comprising:
      a seat base configured to support at least a portion of a weight of an occupant of the seat; and
      a seatback associated with the seat base and configured to provide support to at least a portion of a back of the occupant; and
   an actuator controller in communication with a seat actuator and configured to:
      receive a velocity change signal indicative of one or more of an actual change in velocity of the vehicle or a predicted change in velocity of the vehicle; and
      cause, based at least in part on the velocity change signal, one of:
         communicating an electric charge to a damping layer configured to at least partially equalize reaction forces communicated across an area corresponding to at least a portion of the back of the occupant; or controlling the seatback to cause a reaction force to increase from a minimal reaction force to a first reaction force for a first displacement of a front surface of the seatback, and one of:
- decrease from the first reaction force to a second reaction force less than the first reaction force for a further displacement of the front surface of the seatback from the first displacement to a second displacement greater than the first displacement; or
- remain substantially constant for a further displacement of the front surface of the seatback from the first displacement to a third displacement greater than the first displacement.

15. The system of claim 14, wherein the seat actuator is configured to increase a rate of coupling of at least a portion of the seatback to at least a portion of the back of the occupant.

16. The system of claim 14, wherein the seatback comprises at least one crushable element configured to compress in an at least partially non-resilient manner and reduce the reaction forces.

17. A method for protecting an occupant of a vehicle, the method comprising:
providing a seatback comprising a first portion comprising a first material having a first stiffness and a second portion comprising a second material different than the first material, wherein the second portion comprises at least one of:
- a membrane at least partially enclosing a third material; or
- a damping layer configured change at least one material characteristic upon application of an electrical charge;

receiving a triggering signal indicative of at least one of an actual change in velocity of the vehicle or a predicted change in velocity of the vehicle; and
causing, based at least in part on the triggering signal, at least one of:
- communication of an electric charge to the damping layer; or
- an increase in pressure in an interior of the membrane to cause a reaction force from the seatback against at least a portion of the back of the occupant to increase from a minimal reaction force to a first reaction force for a first displacement of a front surface of the seatback, and releasing pressure inside the membrane to cause the reaction force to one of:
  - decrease from the first reaction force to a second reaction force less than the first reaction force as displacement of the front surface of the seatback further displaces from the first displacement to a second displacement greater than the first displacement; or
  - remain substantially constant as displacement of the front surface of the seatback further displaces from the first displacement to a third displacement greater than the first displacement.

18. The method of claim 17, comprising causing, based at least in part on the triggering signal, communication of an electric charge to the damping layer, wherein causing communication of the electric charge to the damping layer causes a reaction force from the seatback against at least a portion of the back of the occupant to increase from a minimal reaction force to a first reaction force for a first displacement of a front surface of the seatback, and the method further comprises discontinuing communication of the electric charge to the damping layer to cause the reaction force to one of:
- decrease from the first reaction force to a second reaction force less than the first reaction force as displacement of the front surface of the seatback further displaces from the first displacement to a second displacement greater than the first displacement; or
- remain substantially constant as displacement of the front surface of the seatback further displaces from the first displacement to a third displacement greater than the first displacement.

19. The method of claim 17, further comprising tuning the reaction force by providing the seatback with at least one crushable element having at least one of a shape, a thickness, a construction, or a material selected to provide a stiffness characteristic of the seatback.

* * * * *